United States Patent [19]
Dye et al.

[11] Patent Number: 6,102,965
[45] Date of Patent: *Aug. 15, 2000

[54] SYSTEM AND METHOD FOR PROVIDING CLIENT/SERVER ACCESS TO GRAPHICAL PROGRAMS

[75] Inventors: Robert E. Dye; Omid Sojoodi, both of Austin, Tex.

[73] Assignee: National Instruments Corporation, Austin, Tex.

[ * ] Notice: This patent is subject to a terminal disclaimer.

[21] Appl. No.: 08/916,005

[22] Filed: Aug. 21, 1997

Related U.S. Application Data

[63] Continuation-in-part of application No. 08/810,079, Mar. 4, 1997, which is a continuation-in-part of application No. 08/717,771, Sep. 23, 1996.

[51] Int. Cl.[7] .................................................. G06F 17/30
[52] U.S. Cl. ................................................. 717/1; 707/10
[58] Field of Search ................................... 395/701, 702; 717/1; 707/10

[56] References Cited

U.S. PATENT DOCUMENTS

| | | | |
|---|---|---|---|
| 4,901,221 | 2/1990 | Kodosky et al. | 345/348 |
| 5,097,411 | 3/1992 | Doyle et al. | 345/522 |
| 5,251,322 | 10/1993 | Doyle et al. | 345/501 |
| 5,261,043 | 11/1993 | Wolber et al. | 345/347 |
| 5,481,741 | 1/1996 | McKaskle et al. | 345/522 |
| 5,513,311 | 4/1996 | McKiel, Jr. | 395/161 |
| 5,576,946 | 11/1996 | Bender et al. | 700/17 |
| 5,640,572 | 6/1997 | Mondrik et al. | 710/262 |
| 5,673,403 | 9/1997 | Brown et al. | 395/335 |
| 5,737,607 | 4/1998 | Hamilton et al. | 717/1 |
| 5,758,084 | 5/1998 | Silverstein et al. | 395/200.58 |
| 5,802,526 | 9/1998 | Fawcett et al. | 707/104 |
| 5,862,339 | 1/1999 | Bonnaure et al. | 395/200.57 |
| 5,864,683 | 1/1999 | Boebert et al. | 709/249 |
| 5,867,665 | 2/1999 | Butman et al. | 395/200.68 |
| 5,897,635 | 4/1999 | Torres et al. | 707/10 |
| 5,995,606 | 11/1999 | Civanlar et al. | 379/201 |

OTHER PUBLICATIONS

Smedley, Trevor J., "Visual Programming Applied to Industrial Software Development", 1995, pp. 2–28.

Pleas, K., BYTE Magazine Special Report, Apr. 1996, "OLE's Missing Links: An emerging standard for communication between applications, OLE 2 will work better when software vendors agree on its meaning," 6 pages.

Linthicum, D., BYTE Magazine State of the Art, Jan. 1996, "Integration, Not Perspiration: CORBA, OLE, and Open-Doc: Three technologies for desktop components face off," 11 pages.

Myers, User Interface Software Tools, 1995, p. 65–81.

Keller et al., User Interface Development and Software Environment: The Chiron–1 System, Jul. 1991, p. 208–218.

Clement, A distributed Architecture for Programming Environments, 1990, p. 11–21.

Swenson, Visual Support for Reengineering Work Processes, 1993, p. 130–141.

*Primary Examiner*—Paul R. Lintz
*Assistant Examiner*—John Q. Chavis
*Attorney, Agent, or Firm*—Conley, Rose & Tayon P.C.; Jeffrey C. Hood

[57] ABSTRACT

A graphical programming development system for creating a graphical program client, wherein the graphical program client is operable to programmatically access or invoke functionality of graphical programming applications or graphical programs. In one embodiment, the method provides a set of VI Server function nodes and controls which a user employs to create a client graphical program. The client executes in a computer which includes a display screen and a user input device. In one embodiment, the client performs instrumentation control functions. The user can thus create diagrams in a graphical programming system, e.g. LabVIEW, that get/set properties and invoke operations on both graphical programming applications and graphical programs (VIs) within the respective user's local version of LabVIEW as well as on other copies of LabVIEW or graphical programs on a network, such as a TCP/IP network.

66 Claims, 12 Drawing Sheets

Using Generic VI References With The Property And Invoke Nodes

Front Panel Refnum Controls

Open Application Reference

Open VI Reference

Close Application Or VI Reference

Call By Reference Node

Property Node

Invoke Node

Using Strictly-typed VI References

Using Generic VI References With The Property And Invoke Nodes

The Select LabVIEW Class Submenu

Server Configuration Dialog Box

Server TCP/IP Dialog Box

Server TCP/IP Access

SYSTEM AND METHOD FOR PROVIDING CLIENT/SERVER ACCESS TO GRAPHICAL PROGRAMS

CONTINUATION DATA

This is a continuation in part of co-pending patent application Ser. No. 08/810,079 titled "System and Method for Developing Automation Clients using a Graphical Data Flow Program" filed on Mar. 4, 1997, whose inventors were Murali Parthasarathy and Omid Sojoodi, and which is assigned to National Instruments Corporation, which is a continuation-in-part of co-pending application Ser. No. 08/717,771 titled "System and Method for Performing Class Checking of Objects in a Graphical Data Flow Program" (Atty. Dkt. No. 5150-16900) and filed Sep. 23, 1996, whose inventors were Omid Sojoodi and Stephen W. Rogers.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

1. Field of the Invention

The present invention relates to graphical programming, and more particularly to accessing server graphical programs and applications by a graphical program client in a graphical data flow program.

2. Description of the Related Art

Traditionally, high level text-based programming languages have typically been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to in this disclosure as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. For example, text-based programming environments have traditionally used a number of programs to accomplish a given task. Each program in turn often comprises one or more subroutines. Software systems typically coordinate activity between multiple programs, and each program typically coordinates activity between multiple subroutines. However, in a text-based environment, techniques for coordinating multiple programs generally differ from techniques for coordinating multiple subroutines. Furthermore, since programs ordinarily can stand alone while subroutines usually cannot in a text-based environment, techniques for linking programs to a software system generally differ from techniques for linking subroutines to a program. Complexities such as these often make it difficult for a user who is not a specialist in computer programming to efficiently program a computer system in a text-based environment.

The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. For example, a computer programmer typically develops a conceptual model for a physical system which can be partitioned into functional blocks, each of which corresponds to actual systems or subsystems. Computer systems, however, ordinarily do not actually compute in accordance with such conceptualized functional blocks. Instead, they often utilize calls to various subroutines and the retrieval of data from different memory storage locations to implement a procedure which could be conceptualized by a user in terms of a functional block. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

One particular field in which computer systems are employed to model physical systems is the field of instrumentation. An instrument is a device which collects information from an environment and displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others. An instrumentation system ordinarily controls its constituent instruments from which it acquires data which it analyzes, stores and presents to a user of the system. Computer control of instrumentation has become increasingly desirable in view of the increasing complexity and variety of instruments available for use.

In the past, many instrumentation systems comprised individual instruments physically interconnected. Each instrument typically included a physical front panel with its own peculiar combination of indicators, knobs, or switches. A user generally had to understand and manipulate individual controls for each instrument and record readings, from an array of indicators. Acquisition and analysis of data in such instrumentation systems was tedious and error prone. An incremental improvement in the manner in which a user interfaced with various instruments was made with the introduction of centralized control panels. In these improved systems, individual instruments were wired to a control panel, and the individual knobs, indicators or switches of each front panel were either preset or were selected to be presented on a common front panel.

A significant advance occurred with the introduction of computers to provide more flexible means for interfacing instruments with a user. In such computerized instrumentation systems the user interacted with a software program executing on the computer system through the video monitor rather than through a manually operated front panel. These earlier improved instrumentation systems provided significant performance efficiencies over earlier systems for linking and controlling test instruments.

However, these improved instrumentation systems had significant drawbacks. For example, due to the wide variety of possible testing situations and environments, and also the wide array of instruments available, it was often necessary for a user to develop a program to control the new instrumentation system desired. As discussed above, computer programs used to control such improved instrumentation systems had to be written in conventional text-based programming languages such as, for example, assembly language, C, FORTRAN, BASIC, or Pascal. Traditional users of instrumentation systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation data. Thus, development and maintenance of the software elements in these instrumentation systems often proved to be difficult.

U.S. Pat. No. 4,901,221 to Kodosky et al discloses a graphical system and method for modeling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor such that the diagram created graphically displays a procedure or method for accomplishing a certain result, such as manipulating one or more input variables to produce one or more output variables. As the user constructs the data flow diagram using the block diagram editor, machine language instructions are automatically constructed which characterize an execution procedure which corresponds to the displayed procedure. Therefore, a user can create an executable computer program solely by using a graphically based programming environment. This graphically based programming environment may be used for creating virtual instrumentation systems and modeling processes as well as for any type of general programming.

Therefore, Kodosky et al teaches a graphical programming environment wherein a user manipulates icons in a block diagram using a block diagram editor to create a data flow "program." A graphical program for controlling instruments or implementing instrumentation or industrial automation functions is referred to as a virtual instrument (VI). In creating a virtual instrument, a user first creates a front panel including various controls or indicators that represent the respective input and output that will be used by the VI. When the controls and indicators are created in the front panel, corresponding icons or terminals are automatically created in the block diagram by the block diagram editor. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. The user adjusts the controls on the front panel to affect the input and views the output on the respective indicators.

In parallel to the development of graphical data flow programming for various applications, such as virtual instrumentation, object technology and networked client/server functionality have emerged in the area of software development.

U.S. patent application Ser. No. 08/810,079 titled "System and Method for Developing Automation Clients using a Graphical Data Flow Program" filed on Mar. 4, 1997 provides a system and method which enables a graphical data flow programming system to access automation servers, e.g., to invoke objects in automation servers, for a variety of applications.

However, it would be desirable to enable a graphical program to be able to access various different types of objects, including program objects or functionality within the same or another graphical program. For example, it would be desirable to enable a graphical program or VI to be able to manipulate another graphical program, e.g., a VI or sub-VI, residing on the same computer or located on a remote computer across a network. It would also be desirable to enable a graphical program or VI to be able to access capabilities or functionality within a graphical program or graphical programming application, such as setting/getting properties and invoking methods, regardless of whether the graphical program or application resides on the same computer or was located on a remote computer across a network. It would further be desirable to provide a graphical programming system which exports its functionality to other applications, such as other graphical programs or software applications.

SUMMARY OF THE INVENTION

The present invention comprises a graphical programming development system which provides a system and method for creating a graphical program client, wherein the graphical program client is operable to programmatically access or invoke functionality of graphical programming applications or graphical programs. In one embodiment, the method provides a set of VI Server function nodes and controls which a user employs to create a client graphical program. The client executes in a computer which includes a display screen and a user input device. In one embodiment, the client performs instrumentation control functions.

The graphical programming system of the present invention, e.g. LabVIEW, exports many of its capabilities to other applications or graphical programs through a new set of features, collectively referred to as VI server. The present invention includes new front panel controls diagram functions, referred to as VI Server function nodes, which allow the user to create client graphical programs which access these capabilities from within the graphical programming system. The user can thus create diagrams in LabVIEW that get/set properties and invoke operations on both LabVIEW applications and graphical programs (VIs) within the respective user's local version of LabVIEW as well as on other copies of LabVIEW or graphical programs on a network, such as a TCP/IP network. The user can also access these VI server capabilities from other clients, such as an ActiveX client, e.g., a Visual Basic application or Microsoft Excel.

In one embodiment the method includes displaying and arranging on the computer screen a VI Server refnum, i.e., a reference to a VI Server class, an open reference node, and either a call by reference node or an invoke node and/or a property node in response to user input, such as the user dragging the nodes from a palette and placing or dropping the nodes in the graphical program, such as a virtual instrument block diagram.

The VI Server refnum is used to specify the VI Server class, such as the VI class or the application class. When the user places a VI Server refnum in the front panel of a graphical program, corresponding terminals are displayed in the block diagram which provide information on the class being referenced.

The open reference node is operable to instantiate an object of the class referenced by the VI Server refnum, such as selecting a particular VI or application. The user specifies access information to the server graphical program or application by connecting one or more terminals to the open reference node. The open reference node is then operable to provide a reference to the instantiated object, e.g., either the server graphical program or application. The open reference node provides the selected VI Server class and class library at edit-time and provides a reference to the object instantiated by the open node at run-time.

The open reference node is connected to either the call by reference node or to one or more of the invoke node and/or property node. The call by reference node is included in the client graphical program to call a graphical program or VI referenced by the open reference node, referred to as the server graphical program. The open reference node provides connector pane information of the server graphical program, and the call by reference node adapts to display the appropriate connector pane on its icon. The user then wires up the connector pane displayed on the call by reference node icon just as if the server graphical program or VI being called was a sub-VI residing in the client graphical program. During run-time, the call by reference node operates to provide inputs connected to the input terminals of the connector pane to the server graphical program, and operates to provide output of the server graphical program on the corresponding output terminals of the connector pane.

The property node is included in the client graphical program to get/set properties in a graphical program or application referenced by the open reference node, referred to as the server. The invoke node is included in the client graphical program to invoke methods in a graphical program or application referenced by the open reference node. In each case, the open reference node provides a reference output to the property or invoke node which identifies the server graphical program or application.

The method further includes constructing executable instructions in response to the graphical program including the VI Server nodes. The executable instructions are operable to access capabilities of an object, such as call a graphical program, or invoke methods and/or get/set properties of the instantiated object. The method then executes the executable instructions on the computer.

During execution, the respective access node, e.g., either the call by reference node or the invoke or property node, in the client communicates with the server to obtain a reference to the server VI or application. The client then operates to create a proxy callee, and the server operates to create a proxy caller, to accomplish calling the server VI or server application.

Thus the present invention provides a system and method for creating a client graphical program, using a graphical programming environment, for invoking methods and/or properties of a graphical program or application, or for calling or invoking a server graphical program.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation By Reference

U.S. patent application Ser. No. 08/810,079 titled "System and Method for Developing Automation Clients using a Graphical Data Flow Program" filed on Mar. 4, 1997, whose inventors were Murali Parthasarathy and Omid Sojoodi, and which is assigned to National Instruments Corporation, is hereby incorporated by reference in its entirety as though fully and completely set forth herein.

U.S. Patent Application Ser. No. 08/716,725 titled "System and Method for Performing Interface Independent Virtual Instrumentation Functions in a Graphical Data Flow Program" filed Sep. 23, 1996, whose inventors were Omid Sojoodi and Scott A. Rust, and which is assigned to National Instruments Corporation, is hereby incorporated by reference in its entirety as though fully and completely set forth herein.

U.S. patent application Ser. No. 08/717,771 titled "System and Method for Performing Class Checking of Objects in a Graphical Data Flow Program" filed Sep. 23, 1996, whose inventors were Omid Sojoodi and Steven W. Rogers, and which is assigned to National Instruments Corporation, is hereby incorporated by reference in its entirety as though fully and completely set forth herein.

U.S. patent application Ser. No. 08/717,772 titled "System and Method for Performing Instrumentation Independent Virtual Instrumentation Functions Using Attribute Nodes in a Graphical Data Flow Program" filed Sep. 23, 1996, whose inventors were Omid Sojoodi and Steven W. Rogers, and which is assigned to National Instruments Corporation, is hereby incorporated by reference in its entirety as though fully and completely set forth herein.

U.S. Pat. No. 5,481,741 titled "Method and Apparatus for Providing Attribute Nodes in a Graphical Dataflow Environment" is hereby incorporated by reference in its entirety as though fully and completely set forth herein.

Instrumentation Control System

Figure 1:
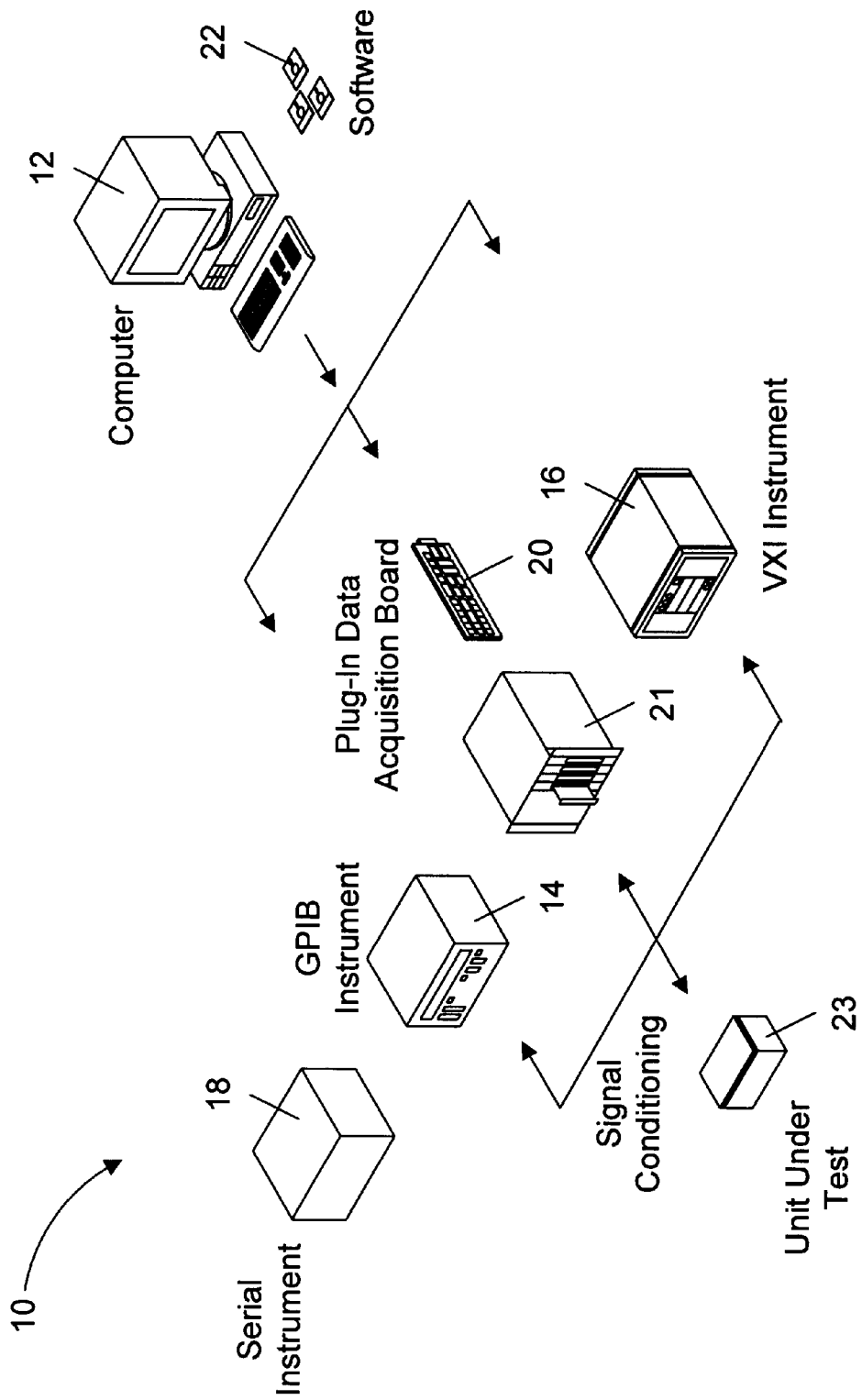
FIG. 1 illustrates an instrumentation control system according to the present invention.

Referring now to FIG. 1, an instrumentation system 10 is shown. The present invention may be used in any of various types of graphical programming systems and graphical data flow programming systems. For example, the present invention may be used in a general purpose graphical programming system or general purpose graphical data flow programming system for any of various types of applications. In the preferred embodiment, the invention is used in a graphical programming system for virtual instrumentation, and this embodiment is described below.

The system 10 comprises a computer 12, which connects to one or more instruments. The one or more instruments may include a GPIB (general purpose interface bus) instrument 14, a VXI (VME eXtension for Instrumentation) chassis 16 comprising one or more VXI card instruments, a serial instrument 18 and/or a data acquisition board 20. The GPIB instrument 14 is coupled to the computer 12 via a GPIB interface provided by the computer 12. The VXI instrument 16 is coupled to the computer 12 via a VXI bus or MXI bus provided by the computer. The serial instrument 18 is coupled to the computer 12 through a serial port, such as an RS-232 port, provided by the computer 12. Finally, the data acquisition board 20 is coupled to the computer 12, typically by being plugged in to an I/O slot in the computer such as a PCI bus slot, an ISA bus slot, an EISA bus slot, or a MicroChannel bus slot provided by the computer 12. In typical instrumentation control systems an instrument will not be present of each interface type and in fact many systems may only have one or more instruments of a single interface type, such as only GPIB instruments. The term "instrument" used herein also includes software code or software objects which implement instrument functionality or are used to control instruments.

The instruments are coupled to a unit under test (UUT) 23, a process, or are coupled to receive field signals, typically generated by transducers. The system 10 may be used in a data acquisition and control application, in a test and measurement application, or an industrial automation application. If the system 10 is used in a data acquisition application, the system 10 also preferably includes signal conditioning circuitry 21 coupled between the data acquisition board 20 and transducers.

The system 10 preferably includes a memory media, such as magnetic media, or floppy disks 22, on which computer programs according to the present invention are stored. In one embodiment of the system 10, software programs according to the present invention are also stored on a memory or hard drive of the computer and executed by a CPU of the computer. The CPU executing code and data from the memory thus comprises a means for performing functions according to the steps described below. In the present disclosure, the term "computer-readable storage media" is intended to include any of various types of memory media or machine readable media for storing data, including floppy disks, CDs or CD-ROMs, and other distributable media, non-volatile computer memories such as hard drives, optical storage, and computer system memory such as DRAM (dynamic RAM), SRAM, EDO RAM or other types of computer memory.

Computer Block Diagram

Figure 2:
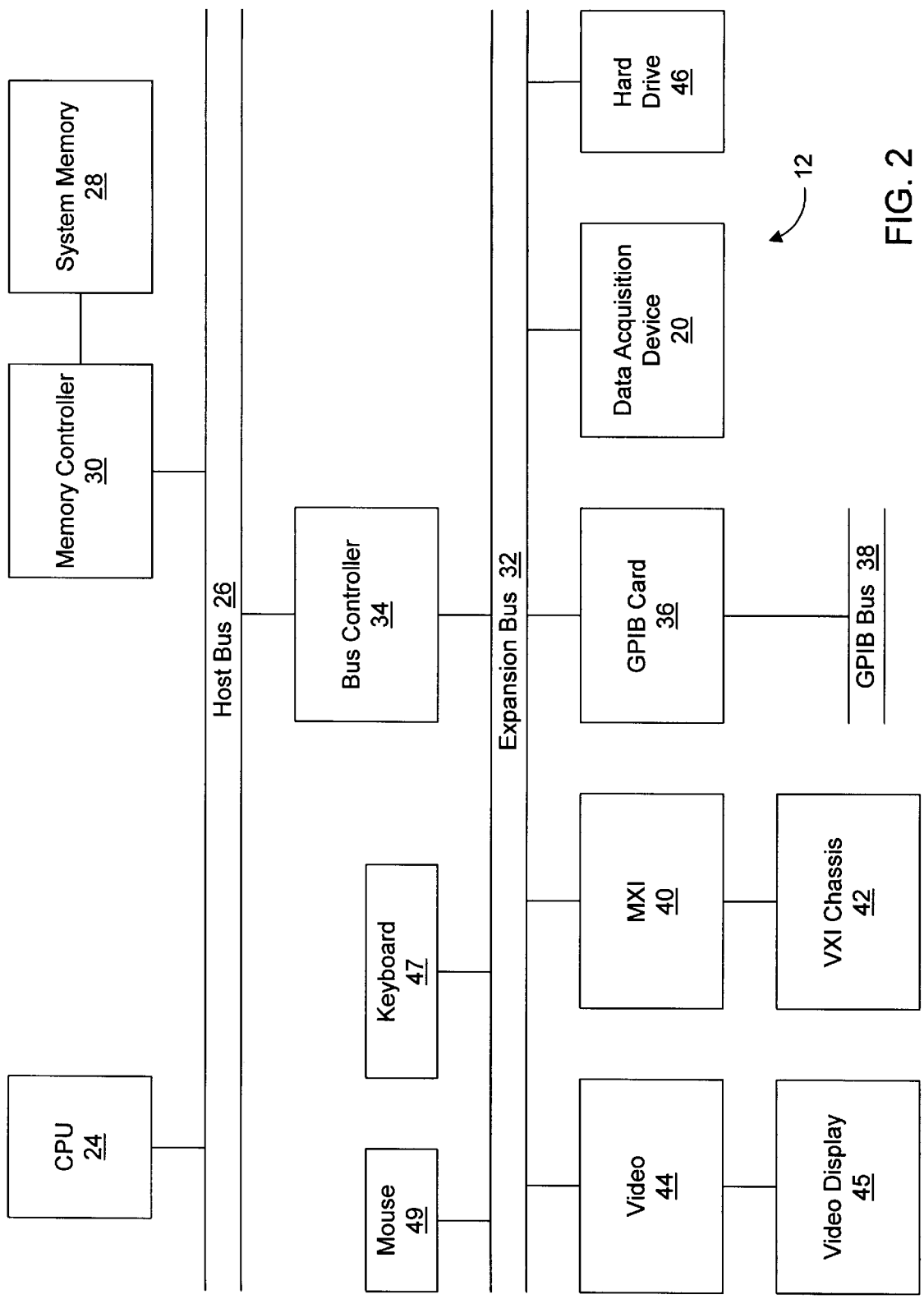
FIG. 2 is a block diagram of the computer of the control system of FIG. 1.

Referring now to FIG. 2, a block diagram of the computer 12 (of FIG. 1) is shown. The elements of a computer not necessary to understand the operation of the system 10 have been omitted for simplicity. The computer 12 includes at least one central processing unit or CPU 24 which is coupled to a processor or host bus 26. The CPU 24 may be any of various types, including an x86 processor, a PowerPC processor, a CPU from the Motorola family of processors, a CPU from the SPARC family of RISC processors, as well as others. Main memory 28 is coupled to the host bus 26 by means of memory controller 30. The main memory 28 stores the various portions of instrumentation control software, including, inter alia, instrumentation control application software, VI server software, and code and data for VI Server nodes and controls. The main memory 28 also stores operating system software as well as the software for operation of the computer system, as well known to those skilled in the art. The instrumentation control software will be discussed in more detail below.

The host bus 26 is coupled to an expansion or input/output bus 32 by means of a bus controller 34. The expansion bus 32 includes slots for various devices such as the data acquisition board 20 (of FIG. 1), a GPIB interface card 36 which provides a GPIB bus interface 38 to the GPIB instrument 14 (of FIG. 1), and an MXI bus card 40 coupled to a VXI chassis 16 for receiving VXI card instruments (of FIG. 1). The computer 12 further comprises a video controller 44 and hard drive 46 coupled to the expansion bus 32. A video display 45 is coupled to the video controller 44 for displaying video information. The computer 12 further comprises a mouse 49 and keyboard 47 for receiving user input.

Graphical Programming System

In the preferred embodiment, the present invention utilizes the LabVIEW or BridgeVIEW graphical programming systems, hereafter collectively referred to as LabVIEW, available from National Instruments. Also, in the preferred embodiment, the term "LabVIEW" is intended to include graphical programming systems which include G programming functionality, i.e., which include at least a portion of LabVIEW graphical programming functionality, including the BridgeVIEW graphical programming system.

A graphical program created using LabVIEW comprises an instrument front panel in a first window and a block diagram in a second window. The block diagram comprises program execution elements, referred to as nodes, which are wired or linked together to produce a data flow program. The front panel comprises controls for providing input data to the block diagram and indicators for receiving and/or displaying output data from the nodes of the block diagram. Certain drawings in the present disclosure comprise screen shots displayed during the execution of LabVIEW according to the present invention.

The term "graphical programming system" is intended to include any of various types of systems which are used to develop or create graphical code or graphical programs, including LabVIEW and BridgeVIEW from National Instruments, Visual Designer from Intelligent Instrumentation, Hewlett-Packard's VEE (Visual Engineering Environment), Snap-Master by HEM Data Corporation, DASYLab by DasyTec, and GFS DiaDem, among others.

Although in the preferred embodiment the graphical programs are involved with data acquisition/generation, analysis, and/or display, and for controlling or modeling instrumentation or industrial automation hardware, it is noted that the present invention can be used to create client graphical programs for a plethora of applications and are not limited to instrumentation or industrial automation applications. In other words, FIG. 1 is exemplary only, and the present invention may be used in any of various types of systems. Thus, the system and method of the present invention is operable for creating client graphical programs or graphical code, and for providing graphical program server functionality, for any of various types of applications, including general purpose software applications such as word processing, spreadsheets, network control, games, etc.

Figure 3:
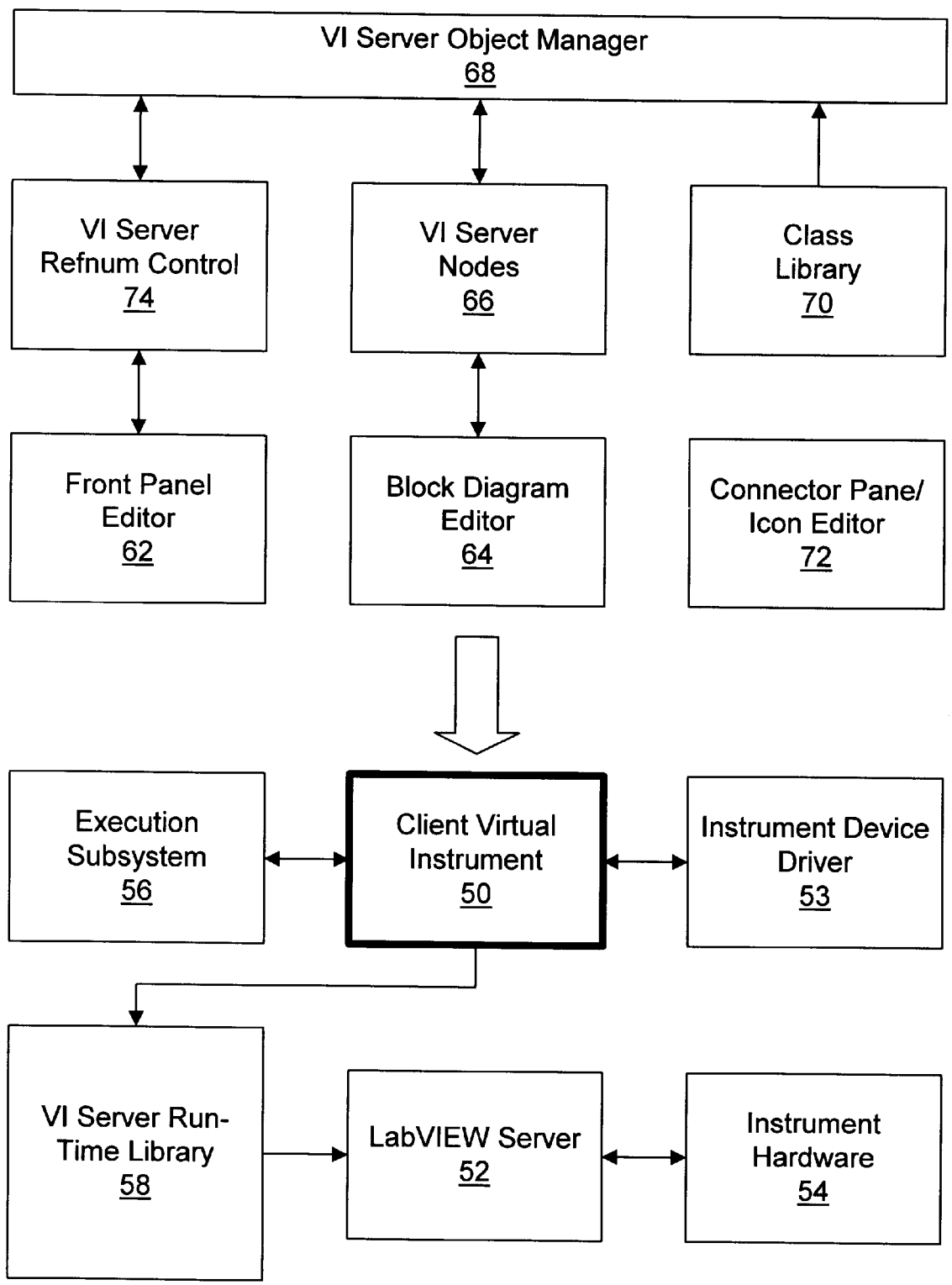
FIG. 3 is a block diagram illustrating the relationship of portions of the instrumentation control system of FIG. 1 according to a first embodiment.

FIG. 3—Graphical Programming Environment

Referring now to FIG. 3, a block diagram illustrating the relationship of portions of the instrumentation control system 10 (of FIG. 1) are shown. Preferably, the elements shown in FIG. 3 (with the exception of the hardware instrument 54) are software elements which are executed on the computer 12 (of FIG. 1). The present invention is used to create a client graphical program which can programmatically access server capabilities of a graphical program application or program, such as LabVIEW or a VI. The present invention is also useable to create a client graphical program portion which is a part of a larger graphical program.

In the preferred embodiment, a programmer employs a front panel editor 62, a block diagram editor 64, and a connector pane/icon editor 72 of a graphical programming environment to produce a graphical program. In the instrumentation application of the preferred embodiment, the graphical program is referred to as a virtual instrument (VI) 50. The block diagram editor 64 generates executable instructions, i.e., machine language instructions, in response to the client virtual instrument or VI 50. The VI 50 developed by the programmer is executed by an execution subsystem 56 of the graphical programming environment to control an instrument 54. The instrument 54 is illustrative of instruments such as those of FIG. 1.

Referring again to FIG. 3, the graphical programming environment further comprises VI Server refnum controls 74. The front panel editor 62 is operable to generate a VI front panel which may include one or more of the VI Server refnum controls 74. The VI Server refnum controls 74 communicate with the VI Server object manager 68 to obtain or provide information regarding class libraries 70 in the system.

The graphical programming environment further comprises VI Server function nodes 66. The VI Server function nodes 66 are shown in FIGS. 5–10. The VI Server function nodes 66 comprise an Open Application Reference node, an Open VI Reference node, a Close Application or VI Reference node, a Call by Reference Node, a Property node and an Invoke node. The Call by Reference Node, the Property node and the Invoke node can be referred to generically as access nodes, since they access functionality or capabilities of a server graphical program or a server graphical programming application.

The block diagram editor 64 is operable to create a VI block diagram, or block diagram. The block diagram editor 64 communicates with the VI Server function nodes 66, which in turn communicate with the VI Server object manager 68. The object manager 68 accesses class libraries 70 to acquire information necessary to perform class and object management operations.

Advantageously, the graphical programming environment, and in particular the VI Server refnum controls 74, the VI Server function nodes 66, the VI Server object manager 68, and the VI Server run-time library 58, enable a graphical program to instantiate objects from the same or other LabVIEW applications or graphical programs, and to remotely call VIs as well as invoke properties and methods of the instantiated objects.

The graphical programming environment further preferably comprises a connector pane/icon editor 72 for forming VI's into subVI's, i.e., a VI which may be used as a graphical programming element in another VI. The reader is referred to U.S. Pat. No. 5,301,336 for more information about the subVI's and the icon editor 72.

The execution subsystem 56 executes the executable instructions constructed from a block diagram of the VI 50. For more information about the execution subsystem 56 the reader is referred to U.S. Pat. No. 5,481,741.

Preferably, the VI 50 calls VIs and/or invokes methods and properties of application or VI objects (LabVIEW server 52) indirectly through the services of the VI. Server manager run-time library 58. Examples of the LabVIEW server 52 include a LabVIEW application, or a graphical program or VI. The server application or VI 52 may be located on the same computer or on another computer. The VI 50 controls the instrument 54 through an instrument device driver 53 which includes executable functions which are called by the VI 50 to perform operations in order to control the instrument 54.

Figure 3A:
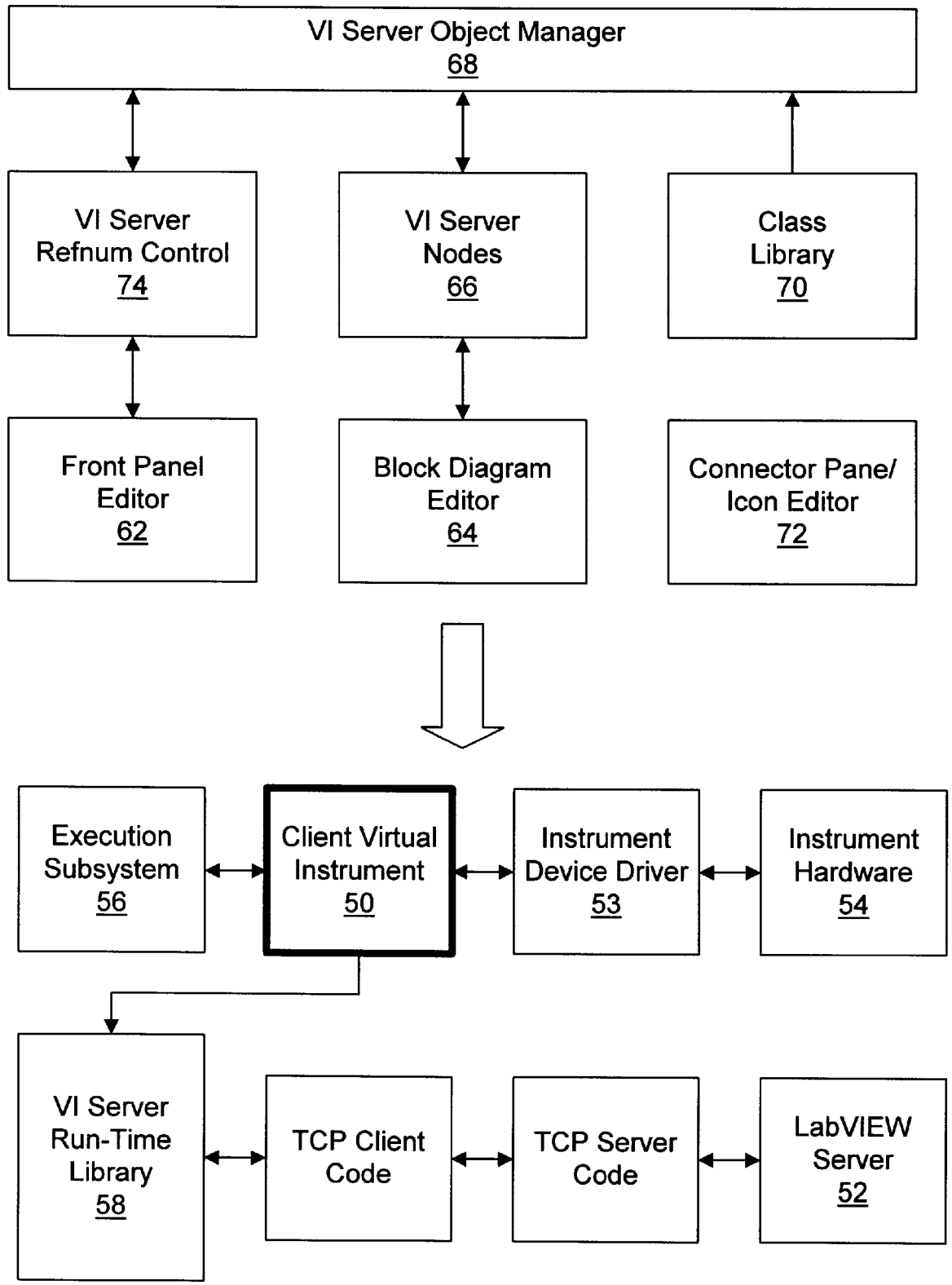
FIG. 3a is a block diagram illustrating the relationship of portions of the instrumentation control system of FIG. 1 where the server is located on a remote computer system.

When the LabVIEW server 52 is located on a different computer, the block diagram appears as shown in FIG. 3A. In an embodiment where the two computers are connected through a TCP/IP connection, such as the Internet, this system further includes TCP client code and TCP server code coupled between the VI Server run-time library 58 and the LabVIEW Server 52, which performs the required communication.

The VI Server nodes 66 and VI Server refnum controls 74 comprise classes and objects, according to the notion of classes and objects in the art of object-oriented programming. Each of the VI Server nodes 66 and the VI Server refnum controls 74 comprise properties and methods. The methods include a method for drawing an icon representation of the object on the video display 45 of the computer 12 either in the VI block diagram or front panel, a method for generating code associated with the different functions of each node or control, and a method for performing class or type propagation checking. The operation of the VI Server nodes 66 and the VI Server controls 74 will be explained in more detail below.

As mentioned above, the client graphical program 50 is not necessarily related to controlling an instrument, but rather the graphical program 50 may be for any of various applications. That is, the client may have an application other than instrumentation control.

Advantageously, the graphical system and method for producing the graphical program or VI 50 has a number of benefits. These benefits include the ability to programmatically access functionality from the same or other graphical programming, applications or graphical programs. This results in a reduction in the development time required to create the VI 50 as well as reduction of the number of code defects in the VI 50. Yet another benefit is the simplicity of programming which makes the development of a graphical program, such as an instrumentation control program, more practical for a larger number of people, i.e., those who might not have the skills, or resources to develop the skills, to develop programs according to more conventional text-based methods. The system and method also provides class propagation, class checking and type checking in a graphical programming environment, discussed further below, thus simplifying program development.

Overview of the Present Invention

The graphical programming system of the present invention, e.g. LabVIEW, exports many of its capabilities to other applications of graphical programs through a new set of features, collectively referred to as VI server. The present invention includes new front panel controls diagram functions, referred to as VI Server function nodes (66 FIG. 3), illustrated in FIGS. 5–10, which allow the user to access these capabilities from within the graphical programming system. The user can thus create diagrams in LabVIEW that get/set properties and invoke operations on both LabVIEW applications and graphical programs (VIs) within the respective user's local version of LabVIEW as well as on other copies of LabVIEW or graphical programs on a network, such as a TCP/IP network. The user can also access these VI server capabilities from other clients such as an ActiveX client, e.g., a Visual Basic application or Microsoft Excel.

Figure 4:
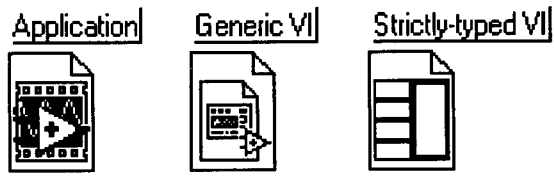
FIG. 4 illustrates the VI Server front panel refnum controls.

FIG. 4—VI Server Refnum Controls

The VI server functionality of the present invention is accessed through references to two main classes of objects, these being the Application object and the VI object. The VI object is further sub-divided into two classes of objects: the Generic VI and the Strictly typed VI. FIG. 4 illustrates the front panel refnum controls for the Application, Generic VI, and Strictly-typed VI data types. As shown in FIG. 4, the image in each refnum icon indicates the type of the refnum. The Application class refnum icon displays the LabVIEW application icon. The Generic VI class refnum icon displays the VI file icon. The Strictly-typed VI class refnum icon depicts the connector pane that defines the class.

The front panel refnum comprises a reference to an object. Thus, the Application refnum provides a reference to a graphical programming application, e.g. a LabVIEW application, the generic VI refnum provides a reference to a generic virtual instrument or generic graphical program, and the strictly typed VI refnum provides a reference to a specified graphical program or VI.

In the preferred embodiment, the user selects a VI Server front panel refnum control and places this refnum control in a front panel of a virtual instrument or graphical program. The user then configures the refnum to be either an Application refnum, a Generic VI refnum, or a Strictly-typed VI refnum. Once the user has configured the refnum control to one of these three types, the refnum control takes on the respective appearance by the class selected by the user. For example, if the user drops the front panel refnum control on the front panel and configures the refnum to be of the Application class, the refnum takes on the Application icon appearance shown in FIG. 4.

When the user drops or places the VI Server refnum in the front panel and configures the refnum, corresponding terminals appear in the block diagram. These terminals provide the information on the application or graphical program referenced by the refnum.

In general, a Generic VI reference is used to perform editing operations (e.g., setting properties or invoking functions) on any VI. A Strictly-typed VI reference is used to call a dynamically loaded VI as a sub-VI, and to perform operations that do not edit or change the VI, such as setting its Front Panel window size or location. An application reference is used to get or set properties on the application, or invoke methods on the application.

FIGS. 5–10 VI Server Functions

FIGS. 5–10 illustrate the VI server function nodes according to the preferred embodiment of the invention. As noted above, these function nodes or diagram functions, can be used in a graphical program to access capabilities of other LabVIEW applications or VIs. More specifically, these diagram functions can be placed in a graphical program or virtual instrument and can be used to programmatically obtain references to specific instances of the above classes. For example, an instance of the application class could be the LabVIEW graphical programming application running on the respective user's system, or a LabVIEW application running on another computer system which is connected to the user's computer system through a network, such as the Internet. Thus, an instance of the application class could be a LabVIEW application running anywhere in the world on the Internet, even on a different platform. In a similar manner, an instance of the Generic VI class could be any VI on the user's computer or any exported VIs in a remote version of LabVIEW. An instance of the Strictly-typed VI class could be a specified VI running in the user's LabVIEW application or any other specified VI residing the user's computer or on a remote computer system.

It is noted that, for security, the user can configure the LabVIEW application to allow and disallow certain Internet addresses from establishing connections, as well as allow and disallow certain VIs from being referenced by external programs.

Each of the VI Server function nodes are described below.

Figure 5:
FIGS. 5–10 illustrate the VI Server function nodes which can be placed in a graphical program and used for programmatically accessing functionality of other graphical programming applications or programs.

FIG. 5—Open Application Reference node

FIG. 5 illustrates the Open Application Reference node. The Open Application Reference node returns a reference to a VI Server application running on the specified computer. If an empty string is specified for machine name, then the node returns a reference to the local LabVIEW application in which this function is running. If a machine name is specified, then the node attempts to establish a TCP connection with a remote VI Server on that machine on the specified port.

The application reference output can be used as an input to the Property and Invoke nodes to get or set properties and invoke methods on the application. The application reference output is used as the input to the Open VI Reference function to obtain references to VIs in that application. The reference is closed with the Close Application or VI Reference function. If the user forgets to close this reference, the reference closes automatically when the top level VI associated with this function finishes executing. However, closing the reference operates to conserve the resources involved in maintaining the connection.

The following describes the inputs and outputs of the Open Application Reference node:

machine name is the address of the computer that runs a copy of LabVIEW to which it is desired to establish a connection. This address can be in dotted decimal notation (such as 130.164.15.250) or domain name notation (such as foo.natinst.com). An empty string will cause this function to return a reference to the local LabVIEW.

port number is the port on which the remote LabVIEW application is listening. If port number is not wired, the default VI Server listener port number (5151) is used.

error in describes error conditions that occur prior to the execution of this function. The default input of this cluster is no error. If the error Boolean of this cluster is True, the Open Application Reference function will do nothing but pass through the error via the error out output.

application reference is the reference to the specified application.

error out contains error information. If error in indicates an error, error out contains the same error information. Otherwise it describes the error status that this function produces.

Figure 6:
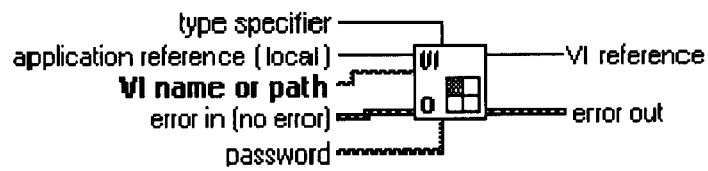

FIG. 6—Open VI Reference node

FIG. 6 illustrates the Open VI Reference node. The Open VI Reference node returns a reference to a VI specified by a name string or path to the VI's location on disk. In the current embodiment, references can only be obtained to standard VIs. This excludes Control, Typedef, and Global VIs. In the preferred embodiment, the Open VI Reference node can be used to obtain a reference to any VI.

References to VIs in another LabVIEW application are obtained by wiring an application reference (obtained from the Open Application Reference function) to this function. In this case, the path input refers to the file system on the remote LabVIEW computer. If a reference is wired to the local LabVIEW application the same behavior is obtained as if nothing had been wired to the application reference input.

If editing operations are to be performed on the referenced VI, and the VI has a password-protected diagram, the password is provided to the password string input. If the incorrect password is provided, the Open VI Reference function returns an error and an invalid VI reference. If no password is provided when opening a reference to a VI that is password protected, the reference can still be obtained, operations can only be performed that do not edit the VI.

If the specified VI is to be called through the Call By Reference function, a strictly-typed VI reference is wired to the type specifier input. The function ignores the value of this input. Only the input's type—the connector pane information—is used. By specifying this type, the Open VI Reference function verifies at run time that the referenced VI's connector pane matches that of the type specifier input.

It is noted that, if a Generic VI refnum type is wired to the type specifier input, this results in the same behavior as if the type specifier input had not been wired at all.

If the type specifier input is wired with a strictly-typed VI refnum, the VI must meet several requirements before the VI reference is returned successfully:

1) The VI cannot be broken for any reason.

2) The VI must be runnable as a subVI, that is, it cannot be active as a top-level VI (unless the VI is re-entrant).

3) The connector pane of the VI must match that of the type specifier.

If the user forgets to close this reference using a close reference node, the reference closes automatically when the top-level VI associated with this function finishes executing. However, closing the reference operates to conserve the resources involved in maintaining the connection.

If a strictly-typed reference to a reentrant VI is obtained, a dedicated data space is allocated for that reference. This data space is preferably always used and is used only in conjunction with the output VI reference. This can lead to some new behaviors in LabVIEW. For example, parallel calls (using the Call By Reference node) to a reentrant. VI using the same VI reference does not execute in parallel, but executes serially, one after the other. As another example, a reentrant VI could get a reference to itself (allocating a new data space) and call itself recursively through the Call By Reference node. It is noted that allocating a data space dynamically is both time consuming and memory consuming and is not generally recommended for implementing recursive algorithms.

A VI reference is similar to what is known as a function pointer in other languages. However, in LabVIEW, these function pointers also can be used to call VIs across the network.

The following describes the inputs and outputs of the Open VI Reference node:

application reference is a reference to a LabVIEW application. If this input is left unwired, the reference is to an application on the local version of LabVIEW. If the input is wired, and the reference is to a remote version of LabVIEW, then the remote LabVIEW is queried to return the VI reference.

type specifier is used for its data type only. The value of the input is ignored. The data type of the type specifier input determines the data type of the vi reference output. The type specifier input is used if it is desired to use the output reference to call the VI with the Call By Reference node. If the type specifier input is left unwired, the output is a Generic VI reference.

VI name or path is polymorphic and can accept a string containing the name of the desired VI, or a path containing the complete path (including the name) to the desired VI. If a name string is wired, then the VI must already be in memory. If a path is wired and the VI is already in memory, the VI in memory is obtained, whether its path is the same as the input or not. If the VI is not in memory, then the VI must be at the specified path for this function to succeed. If the VI is at that location, the VI is loaded into memory.

error in describes error conditions that occur prior to the execution of this function. The default input of this cluster is no error.

password is the plain-text file for the VI. If the VI is not password protected, the input is ignored. If the VI is password protected and an incorrect password is entered, the VI can be referenced, but the VI cannot be edited through that VI reference.

vi reference is the refnum associated with the requested VI. If the function fails, "not-a-refnum" is returned.

error out contains error information. If error in indicates an error, error out contains the same error information. Otherwise error out describes the error status that this VI produces.

If the user specifies a remote version of LabVIEW by the application reference input, the path is interpreted on the remote machine in the context of the remote file system. The path is expressed using the local computer's path separators, but is translated to the remote computer's path separators when the request arrives there. For example, to reference a VI on a Macintosh at My HD:LabVIEW VIs:foo.vi from a Windows application, the Window's path syntax: My HD:\LabVIEW VIs\foo.vi would be used. Conversely, to reference a VI on a Windows computer at C:\labview\foo.vi from a Macintosh application, the Macintosh path syntax: C:labview:foo.vi would be used.

Figure 7:
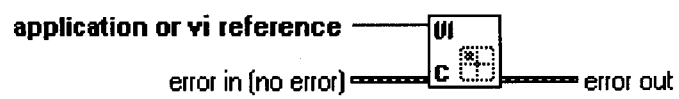

FIG. 7—Close Application or VI Reference

FIG. 7 illustrates the Close Application or VI Reference node. The Close Application or VI Reference node closes an open VI or the TCP connection to an open copy of LabVIEW.

The following describes the inputs and outputs of the Close Application or VI Reference node:

application or vi reference is the refnum associated with an open VI or an opera copy of LabVIEW.

error in describes error conditions that occur prior to the execution of this function. The default input of this cluster is no error.

error out contains error information. If error in indicates an error, error out contains the same error information. Otherwise it describes the error status that this VI produces.

Figure 8:
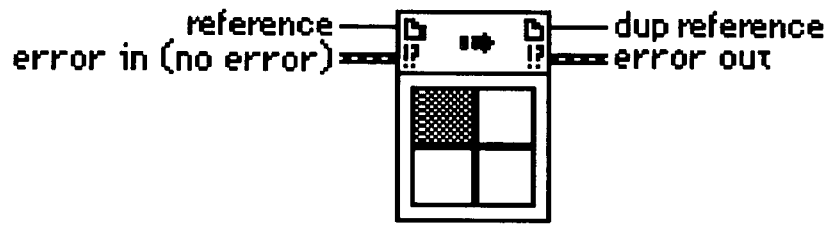

FIG. 8—Call By Reference Node

FIG. 8 illustrates the Call By Reference node. The Call By Reference node is very similar to a sub-VI node in that you either can be used to call a VI. However, a sub-VI node is statically linked to a particular VI that the user determines when he/she drops the node on the diagram. With the Call By Reference node, the VI that is called is determined dynamically at run time by the value of the VI reference wired to the reference input at the top of the node. In fact, it is possible that the VI which is called by the Call By Reference node might be on a different computer.

The top of the Call By Reference node includes four terminals: an input/output pair of flow through VI reference terminals, and an input/output pair of flow through error clusters. The VI reference input accepts wires only from strictly-typed VI references. Below these terminals is an area within which a connector pane resides (is displayed) that is identical to that of a VI with its terminals showing (rather than its icon). The connector pane of the strictly-typed VI reference input determines the pattern and data types of this connector pane which is displayed in the Call By Reference node icon. The user wires to these terminals just as he/she would to a normal sub-VI.

As long as none of the terminals of the connector pane have wires attached to them, the connector pane will adapt automatically to that of the input VI reference's connector pane. However, if any of them are wired, the node does not adapt automatically, and the user must explicitly change the connector pane (possibly breaking those wires) by popping up on the node and selecting the Adapt To Reference Input menu item.

At run time there is a small amount of overhead in calling the VI that is not necessary in a normal sub-VI call. This overhead comes from validating the VI reference and a few other bookkeeping details. However, for a call to a VI in the local LabVIEW, this overhead should be insignificant for all but the smallest subVIs. Calling a VI located in another LabVIEW application (across the network) involves considerably more overhead.

The following describes the inputs and outputs of the Call By Reference node:

reference is the refnum associated with a VI that is already open.

error in describes error conditions that occur prior to the execution of this function. The default input of this cluster is no error.

dup reference has the same value as reference.

error out contains error information. If error in indicates an error, error out contains the same error information. Otherwise, it describes the error status that this VI produces.

Property Node

Figure 9:
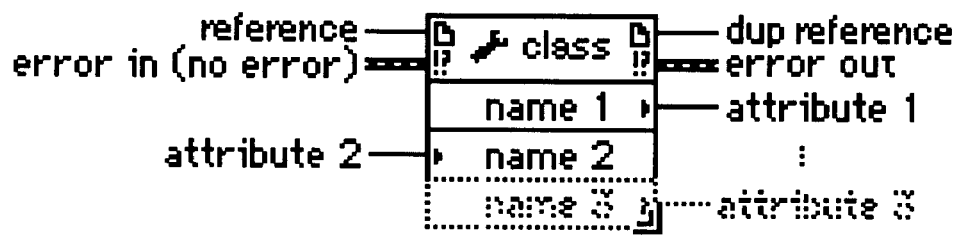

FIG. 9 illustrates the Property node. The Property node sets (writes) or gets (reads) VI and application property information. To select the VI or application class, the user pop ups on the node and selects the Select LabVIEW Class submenu. To set an application class, the user selects Application. To set a VI class, the user selects Generic VI, or wires the VI or application refnum to reference and the node choices change accordingly.

To select a specific property, the user pop ups on one of the name terminals and selects Properties. To set property information, the user pop ups and selects Change to Write. To get property information the user pop ups and selects Change to Read. Some properties are read only, so Change to Write cannot be seen in the popup menu. The Property Node works the same way as Attribute Nodes. If the user desires to add items to the node, the user pop ups and selects Add Element or clicks and drags the node to expand the number of items in the node. The properties are changed in the order from top to bottom. If an error occurs on one of the properties, the node stops at that property and returns an error. In this case, no further properties are handled. The error string reports which property caused the error. If the small direction arrow on a property is on the left, then the property value is being set. If the small direction arrow on the property is on the right, the user is getting the property value. Each property name has a short or long name which can be changed by popping up and selecting Name Format. Another name format is no name where only the type is displayed for each property. The VI and application properties that can be used with the Property node are more fully described below in sections titled Properties—Virtual Instrument Class and Properties—Application Class.

The inputs and outputs of the Property node are described below.

reference is the refnum associated with an open VI or an open copy of LabVIEW across a TCP connection.

error in describes error conditions that occur prior to the execution of this function. The default input of this cluster is no error.

dup reference has the same value as reference.

error out contains error information. If error in indicates an error, error out contains the same error information. Otherwise error out describes the error status that this VI produces.

Invoke Node

Figure 10:
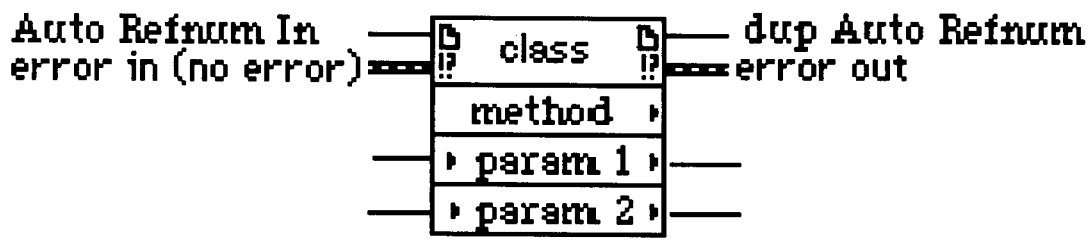

FIG. 10 illustrates the Invoke node. The Invoke node invokes a method or action on a VI. Most methods have parameters associated with them. To select the method, the user pops up anywhere on the node and select Methods. Once the user selects the method, the associated parameters appear as shown in FIG. 10. The user can then set and get the parameter values. Parameters with a white background are required inputs and the parameters with a gray background are recommended inputs. The VI and application methods and their associated parameters that can be used with the Invoke node are discussed below.

The inputs and outputs of the Invoke node are as follows:

auto refnum in is the refnum associated with a VI on which the user desires to perform an action. error in describes error conditions that occur prior to the execution of this function. The default input of this cluster is no error.

dup Auto Refnum has the same value as Auto Refnum In. error out contains error information. If error in indicates an error, error out contains the same error information. Otherwise error out describes the error status that this VI produces.

Figure 11:
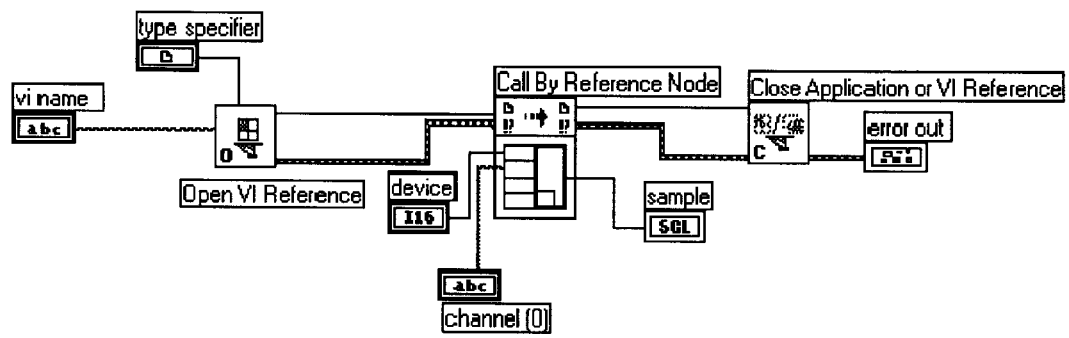
FIG. 11 illustrates a block diagram or graphical program which uses Strictly-typed VI references and utilizes the call by reference node to call a server VI in a client VI.

FIG. 11—Graphical Program using Strictly-Typed VI References

FIG. 11 illustrates a block diagram or graphical program which uses Strictly-typed VI references. It is noted that the order in which the various nodes are placed in the diagram and wired up is not important, and various orders may be used, as desired.

In order to create the graphical program, first the user drops or places a VI Server refnum in a front panel of the graphical program. When the user places the VI Server refnum in the front panel, corresponding terminals appear in the block diagram. There are two different situations in which a strictly-typed VI refnum control is used. The first and perhaps most typical is to pass a strictly-typed VI reference into a VI as a parameter. In this case, the user connects the strictly-typed refnum control to the connector pane of the VI, and the user wires the refnum's terminal on the diagram as the input to the Invoke, Property, or Call By Reference nodes. The value of the refnum is used by each of the these nodes to determine the VI on which it will operate.

The second situation occurs when a strictly-typed refnum control is used as the type specifier for the Open VI Reference function. In this case, the value of the control is ignored—only the type information is used by the Open VI Reference function. It is also possible to use the same strictly-typed refnum control for both of the above situations.

Figure 14:
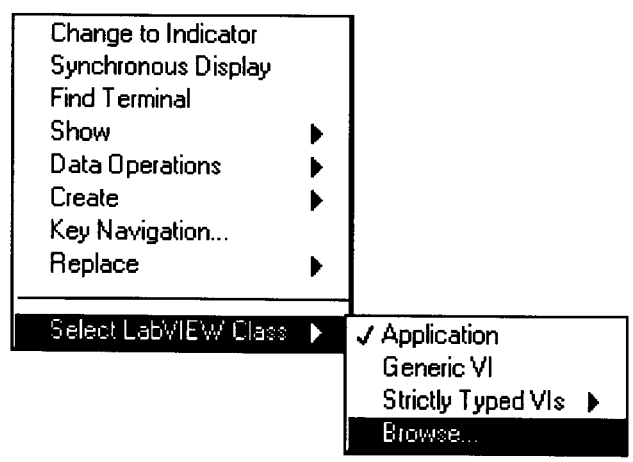
FIG. 14 is a is a screen shot illustrating the "Select LabVIEW Class" submenu.

The user drops the VI refnum control on a front panel from the Controls>>Path and Refnum palette. The user chooses the refnum called Application or VI Reference. By default, the type of this refnum is the Application class. To change the refnum control's type, the user pops up on this control and selects the Select LabVIEW Class submenu, as shown in FIG. 14. In this submenu the choices are Application, Generic VI, Browse . . . and a Strictly Typed VIs palette submenu of previously browsed and selected Strictly-typed VI classes.

When the user selects Browse . . . , the Choose VI to open dialog box appears asking the user to select a VI from the file system. The connector pane of the VI that is selected determines the type of the Strictly-typed VI refnum. Selecting the VI establishes that particular refnum control as the class of VIs (that is, VIs with similar connector panes) that the node passes. It is noted that, in the preferred embodiment, only the connector pane of the selected VI is used to establish the refnum's type. LabVIEW does not make any association between the refnum control and the selected VI. In particular, establishing a refnum's type does not provide a reference to the selected VI.

After the user has placed the VI Server refnum in the front panel and has selected a Strictly-typed class, the corresponding terminals in the block diagram provide the respective class information.

The user then drops or places an open reference node in the graphical program, as shown in FIG. 11. For a VI which uses Strictly-typed VI references, the open reference node is the Open VI Reference node. As noted above, in general, a Generic VI reference is used to perform editing operations (e.g., setting properties or invoking functions) on any VI. A Strictly-typed VI reference is used to call a dynamically loaded VI as a sub-VI, and to perform operations that do not edit or change the VI, such as setting its Front Panel window size or location.

The method specifies whether Open VI Reference opens a Generic VI reference or a Strictly-typed VI reference at the point where the user opens the reference to the VI. To get a Strictly-typed VI reference, the user wires a type specifier control to the "type specifier" input of the Open VI Reference function, as shown in FIG. 11. The type specifier specifies the required connector pane of the VI to be called when the VI is loaded at run time. This type specifier also determines the type of the VI reference output of the Open VI Reference function. When the user wires this output to the Call By Reference node, the node adapts to have the same set of input and output terminals as the original type specifier. In other words, the Call By Reference node icon changes appearance to display the connector pane based on its received input.

The Open VI Reference function does not use the names of input and outputs to determine if a VI matches the class established in the node. However, class matching is fairly strict and all of the following must match:

1) connector pane pattern and orientation
2) unconnected and connected terminals, and their types and direction (that is, whether they are input or output)
3) whether an input is required or not After the user establishes the connector panes, LabVIEW retains them in the Strictly Typed VIs submenu, where the user can select them again later. These connector panes are available for a single LabVIEW session only. After quitting and relaunching LabVIEW, this palette submenu is empty until more VIs are selected for their connector pane types.

The user also connects a terminal to the "VI name or path" input of the Call by Reference node to provide the name or path of the VI. The user further connects other inputs of the Open VI Reference node, including the application reference and any desired password.

When the Open VI Reference runs and locates the requested VI (which the user specifies by either a name string or a full path), the Open VI Reference node checks to see that the connector pane of the VI matches that of the type-specifier input (specified by the "type specifier" control). If the connector pane does not match, the Open function fails and returns an error and an invalid reference. If the connector pane does match, then the Open function succeeds and a reference to the VI is returned.

The user then drops a Call by Reference node in the graphical program or block diagram. The user then wires the "vi reference" output of the Open VI Reference node to the reference input of the Call by Reference node. As noted above, the VI reference input accepts wires only from strictly-typed VI references.

As discussed above, the Call by Reference node displays a connector pane comprising input and output terminals corresponding to the referenced VI or graphical program. The Call By Reference node is very similar to a sub-VI node in that either can be used to call a VI. In essence, the Call By Reference node is a sub-VI node is statically linked to a particular VI that the user determines when he/she drops the node on the diagram. The connector pane of the strictly-typed VI reference input determines the pattern and data types of the connector pane which is displayed in the Call By Reference node icon.

The user wires to the terminals on the connector pane displayed in the Call By Reference node icon just as he/she would to a normal sub-VI. Thus, as shown in FIG. 11, two of the inputs to the connector pane are wired to receive inputs, these being "device", which is a 16 bit integer, and a "channel(0) string. The remaining inputs are optional and are unconnected. The output of the connector pane is wired to an output terminal referred to as "sample" corresponding to an indicator on the front panel.

Thus, the graphical program portion shown in FIG. 11 essentially performs the same function as if the VI being called were present. If the graphical program portion shown in FIG. 11 was part of a larger graphical program, the graphical program portion shown in FIG. 11 would essentially perform the same function as if the VI being called were present as a sub-VI in the larger graphical program.

The connector pane adapts automatically to that of the input VI reference's connector pane, presuming none of the terminals of the connector pane in the Call by Reference node have wires attached to them. However, if any of the terminals are wired, the node does not adapt automatically, and the user must explicitly change the connector pane (possibly breaking those wires) by popping up on the Call by Reference node and selecting the Adapt To Reference Input menu item.

The user then drops the Close Application or VI Reference node in the diagram or graphical program and connects the "vi reference" output of the Call by Reference node to the input of the "application or vi reference" input. The user may also wire up the error in and error out of both the Call by Reference node and the Close Application or VI Reference node at this time.

With this complete, the user has completed a client graphical program which operates to call a VI, wherein the VI may reside on the same or another computer.

With the Call By Reference node, the VI that is called is determined dynamically at run time by the value of the VI reference wired to the reference input at the top of the node. At run time there is a small amount of overhead in calling the VI that is not necessary in a normal sub-VI call. This overhead comes from validating the VI reference and a few other bookkeeping details. However, for a call to a VI in the local LabVIEW, this overhead should be insignificant for all but the smallest subVIs. Calling a VI located in another LabVIEW application (across the network) involves considerably more overhead.

Figure 12:
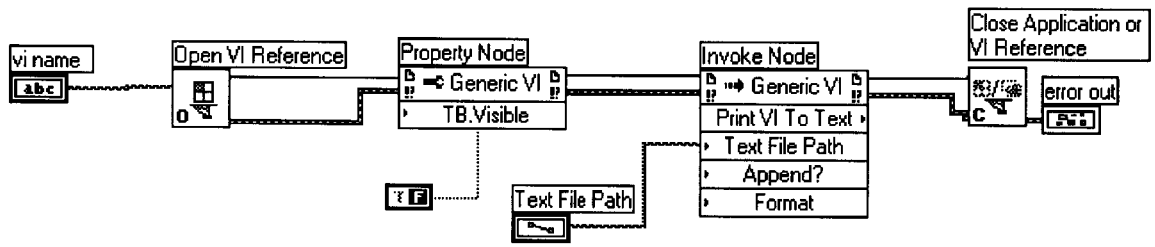
FIG. 12 illustrates a block diagram or graphical program which uses Generic VI references with the Property and Invoke nodes.

FIG. 12—Using Generic VI References with the Property and Invoke nodes

FIG. 12 illustrates a graphical program or block diagram which uses a generic VI reference and uses a property node to get/set properties on the generic VI and uses an invoke node to invoke methods on the generic VI.

In order to create the graphical program, first the user drops or places a VI Server refnum in a front panel of the graphical program. When the user places the VI Server refnum in the front panel, corresponding terminals appear in the block diagram. The user drops the VI refnum control on a front panel from the Controls>>Path and Refnum palette. The user chooses the refnum called Application or VI Reference. By default, the type of this refnum is the Application class. To change the refnum control's type, the user pops up on this control and selects the Select LabVIEW Class submenu, as shown in FIG. 14. In this submenu the choices are Application, Generic VI, Browse . . . and a Strictly Typed VIs palette submenu of previously browsed and selected Strictly-typed VI classes. In this example, the user selects the Generic VI option.

After the user has placed the VI Server refnum in the front panel and has selected a Generic VI class, the corresponding terminals in the block diagram provide the respective class information.

The user then drops or places an open reference node in the graphical program, as shown in FIG. 11. For a VI which uses Generic VI references, the open reference node is the Open VI Reference node. It is noted that the Open Application node can be used to provide an application reference output to an input of the Open VI Reference node. As noted above, in general, a Generic VI reference is used to perform editing operations (e.g., setting properties or invoking functions) on any VI. The user wires the vi name terminal to the vi name or path input of the Open VI Reference node.

The method specifies whether Open VI Reference opens a Generic VI reference or a Strictly-typed VI reference at the point where the user opens the reference to the VI. To get a Generic VI reference, the user leaves the type specifier input of the Open VI Reference function unconnected, as shown in FIG. 12. Alternatively, the user wires a Generic VI refnum to the type specifier input of the Open VI Reference function. This type specifier also determines the type of the VI reference output of the Open VI Reference function.

If the user does not wire a strictly-typed VI refnum to the type specifier input, then the type of the VI reference output defaults to the Generic VI class. In this case, the Open function does not attempt to match the connector pane, and so a reference to any VI can be obtained. This is done where the user desires to programmatically edit the VI. However, a Generic VI reference cannot be wired to the Call By Reference Node because, without the type specifier that describes the VI's connector pane, LabVIEW does not have enough information to generate a correct call to the VI.

As shown in FIG. 12, the user can then drop or place one or more Property nodes and/or Invoke nodes in the graphical program. As shown, each of the Property nodes and/or Invoke nodes in the graphical program include a reference input which receives the Generic VI reference output from the Open VI Reference node. Each of Property nodes and/or Invoke nodes also include a dup reference output which is used to pass the reference to other nodes in the diagram. As shown, the dup reference output of the Property node is provided to the reference input of the Invoke node.

As described above, the Property node sets (writes) or gets (reads) VI and application property information. To select the VI or application class, the user pop ups on the node and selects the Select LabVIEW Class submenu. To set an application class, the user selects Application. To set a VI class, the user selects Generic VI, or wires the VI or application refnum to reference and the node choices change accordingly.

To select a specific property, the user pop ups on one of the name terminals and selects Properties. To set property information, the user pop ups and selects Change to Write. To get property information the user pop ups and selects Change to Read. Some properties are read only, so Change to Write cannot be seen in the popup menu. The Property Node works the same way as Attribute Nodes. If the user desires to add items to the node, the user pop ups and selects Add Element or clicks and drags the node to expand the number of items in the node. The properties are changed in the order from top to bottom.

Each property name has a short or long name which can be changed by popping up and selecting Name Format. Another name format is no name where only the type is displayed for each property. The VI and application properties are more fully described below in sections titled "Properties—Virtual Instrument Class and Properties—Application Class".

In the example of FIG. 12, the Property node is configured to set a property called "TB.Visible".

As described above, the Invoke node invokes a method or action on a VI. Most methods have parameters associated with them. To select the method, the user pops up anywhere on the node and select Methods. Once the user selects the method, the associated parameters appear. The user can then set and get the parameter values. Parameters with a white background are required inputs and the parameters with a gray background are recommended inputs.

In the example of FIG. 12, the Invoke node is configured to perform the Print VI to text method with the following parameters being retrieved: Text File Path, Append? and Format.

The user then drops the Close Application or VI Reference node in the diagram or graphical program and connects the "vi reference" output of the Invoke node to the input of the "application or vi reference" input. The user may also wire up the error in and error out inputs and outputs, as well as other terminals, of the Property node, the Invoke node and the Close Application or VI Reference node at this time.

With this complete, the user has completed a client graphical program which operates to get/set properties and invoke methods on a VI, wherein the VI may reside on the same or another computer.

Figure 13:
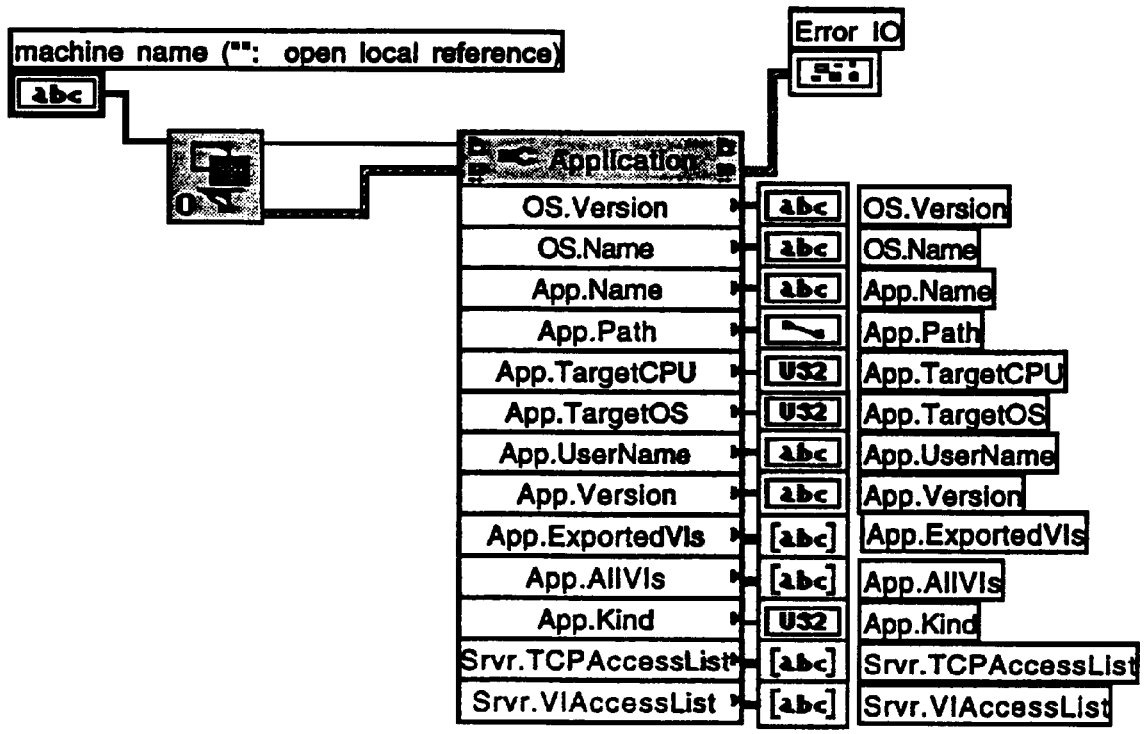
FIG. 13 illustrates a block diagram or graphical program which includes an Open Application node and the Property and/or Invoke nodes to access capabilities of a server application.

FIG. 13—Accessing Server Application Functionality with the Property and Invoke nodes FIG. 13 illustrates a graphical program or block diagram which uses accesses capabilities of a server application, e.g., uses a property node to get/set properties on the server application and/or uses an invoke node to invoke methods on the server application.

In order to create the graphical program, first the user drops or places a VI Server refnum in a front panel of the graphical program. When the user places the VI Server refnum in the front panel, corresponding terminals appear in the block diagram. The user drops the VI refnum control on a front panel from the Controls>>Path and Refnum palette. The user chooses the refnum called Application or VI Reference. By default, the type of this refnum is the Application class, and thus this class is automatically selected.

After the user has placed the VI Server refnum in the front panel and has selected the Application class, the corresponding terminals in the block diagram provide the respective class information.

The user then drops or places an open reference node in the graphical program, as shown in FIG. 13. To access capabilities of a server application, the open reference node is the Open Application Reference node. As noted above, in general, an Application reference is used to perform editing operations (e.g., setting properties or invoking functions) on any application. The user wires the machine name terminal to the machine name input of the Open Application Reference node.

The user then drops or places a Property node in the diagram, and wires the application reference output of the Open Application node to the input of the Property node. As shown, the user can then select one or more properties as described above. As shown, the error output of the Property node is connected to an Error IO terminal. Although not shown in FIG. 13, the dup reference output of the Property node is preferably connected to the application reference input of a Close Application node.

Execution

The method further includes constructing executable instructions in response to the graphical program including the VI Server nodes. The executable instructions are operable to access capabilities of an object, such as call a graphical program or application. More particularly, in the case of a call by reference node, the executable instructions are operable to call or invoke a graphical program or VI, and in the case of a property or invoke node, the executable instructions are operable to get/set properties or invoke methods, respectively, of the instantiated object, which can be either a graphical program or application. The method then executes the executable instructions on the computer.

During execution, the respective access node, e.g., either the call by reference node or the invoke or property node, in the client communicates with the server to obtain a reference to the server VI or application. The client then operates to create a proxy callee, and the server operates to create a proxy caller, to accomplish accessing capabilities in the server VI or server application. The operation is discussed in more detail below.

Configuring the VI Server

The user can configure which parts of the VI Server are available to other applications, as well as enable or disable particular protocols and specify which server resources are exported.

1. Server Configuration

To configure the server for external applications, the user selects Edit>>Preferences on the server machine and select Server: Configuration from the drop down menu. The dialog box appears as shown in FIG. 15.

Figure 15:
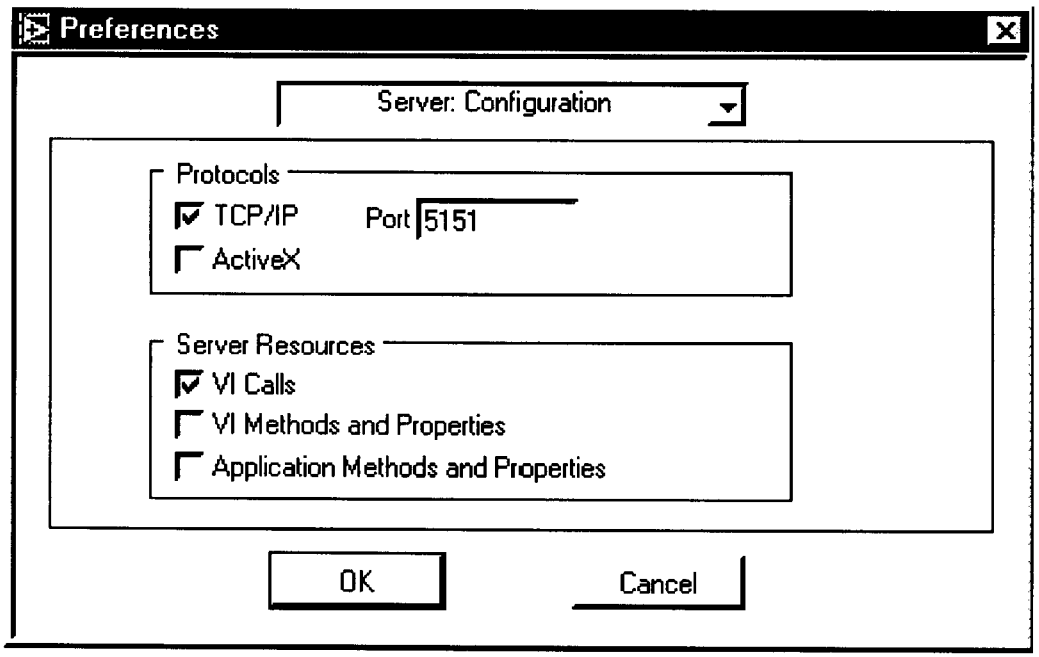
FIG. 15 is a is a screen shot illustrating the Server Configuration Dialog Box.

The options shown in FIG. 15 specify through which communication protocols other applications can access the VI Server: TCP/IP or ActiveX protocols. If the user enables TCP/IP, the user must enter the Port number that client applications use to connect to the server. When the user allows other applications to connect using TCP/IP, the user should also configure which Internet hosts have access to the server. See the TCP/IP Access Configuration section for more information. For more information about the VI server ActiveX interface, refer to U.S. provisional patent application Ser. No. 60/056,528 titled "Graphical Program Automation Servers" filed Aug. 21, 1997, whose inventors are Ram Kudukoli, Robert Dye, and Murali Parthasarathy, which is hereby incorporated by reference.

With Server: Configuration selected, the user also specifies which server resources are available to applications that access the VI Server. The following server resources are available:

VI Calls allows applications to make calls to VIs on the server. When the user allows other applications access to VIs, the user should also configure which VIs they have access to. See the section Exported VIs Configuration for more information.

VI Methods and Properties allows applications to read and set the properties of VIs on the server. When the user allows other applications access to VIs, the user should also configure which VIs they have access to. See the section Exported VIs Configuration for more information.

Application Methods and Properties allows applications to read and set the properties of the server.

In FIG. 15 above, TCP/IP server access is enabled for port 5151 and the ActiveX server access is disabled. The server allows remote clients to call VIs, but does not allow access to VI or application methods and properties.

The default server settings have ActiveX enabled and TCP/IP disabled. By default, VI Calls is enabled, but VI Methods and Properties and Application Methods and Properties are disabled.

2. Exported VIs Configuration

Figure 16:
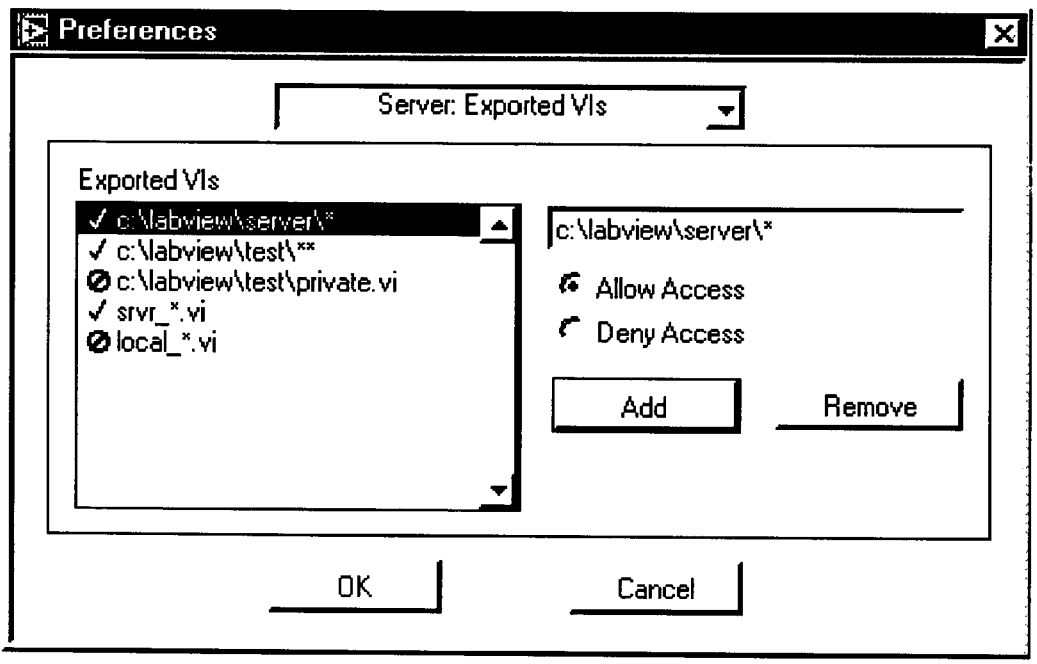
FIG. 16 is a is a screen shot illustrating the TCP/IP Access Dialog Box for selecting Exported VIs.

If the user allows remote applications to access VIs on the VI Server, the user should specify which VIs these applications can access. To configure the exported VIs, the user selects Edit>>Preferences on the server computer, then selects Server: Exported VIs from the drop down menu. The dialog box appears as shown in FIG. 16.

The Server: Exported VIs options allows the user to specify which VIs other applications can access through the VI Server. The Exported VIs list specifies which VIs are exported. To change an entry, the user selects it from the list, then types into the text box at the right of the Exported VIs list. To specify whether remote computers can or cannot access that VI, the user clicks on the Allow Access or Deny Access radio buttons. The user clicks the Add button to insert a new entry after the current selection. The user clicks the Remove button to delete the current selection. The user clicks and drags an entry to change its position within the Exported VIs list. If an entry allows access to VIs, a check mark appears next to the entry. If an entry denies access to VIs, a "cross out" symbol appears next to the entry. If no symbol appears next to the entry, the syntax of the entry is incorrect.

Each entry in the list describes a VI name or a VI path and may contain wildcard characters (see the paragraph below on wildcard characters). Entries that contain path separators are compared against VI paths, while entries that do not contain path separators are compared against VI names only. When a remote client tries to access a VI, the server examines the Exported VIs list to determine whether to grant access to the requested VI. If an entry in the list matches the requested VI, the server either allows or denies access to that VI, based on how that entry is set up. If a subsequent entry also matches the VI, its access permission is used in place of the previous permission. If there is not a VI in the list that matches the requested VI, access to the VI is denied.

As mentioned earlier, the user can use wildcard characters in the Exported VIs list so an entry in the list matches more than one VI. The following wildcard characters can be used:

| | |
|---|---|
| '?' | matches exactly one arbitrary character, except for the path separator. |
| '*' | matches zero or more arbitrary characters, except for the path separator. |
| '**' | together match zero or more arbitrary characters, including the path separator. |

If the user wants to match a VI with a name that contains a wildcard character, the user must escape that character using '\' on the Macintosh and UNIX platforms, and using '' on Windows.

The following tables shows some examples of Exported VI list entries. The examples use UNIX path separators.

TABLE 1

Server: TCP/IP Access Entries

| | |
|---|---|
| * | Matches all VIs |
| /usr/labview/* | Matches all VIs in the directory /usr/labview/. |
| /usr/labview/** | Matches all VIs in the directory /usr/labview/ and any of its sub-directories. |
| Test.vi | Matches any VI named "Test.vi". |
| *export* | Matches any VI with a name that contains the string "export". |
| OK\? | Matches any VI with the name OK?. |

In FIG. 16, all VIs in the c:\labview\server directory are exported. All VIs in the c:\labview\test directory and all its sub-directories are exported as well, with the exception of the VIc:\labview\test\private.vi. Additionally, any VI that begins with the string srvr_ and ends with the string .vi is exported. No VI that begins with the string local_ and ends with the string .vi is exported, even if it is located within the c:\labview\server directory.

The default Exported VIs settings allow access to all VIs.

3. TCP/IP Access Configuration

Figure 17:
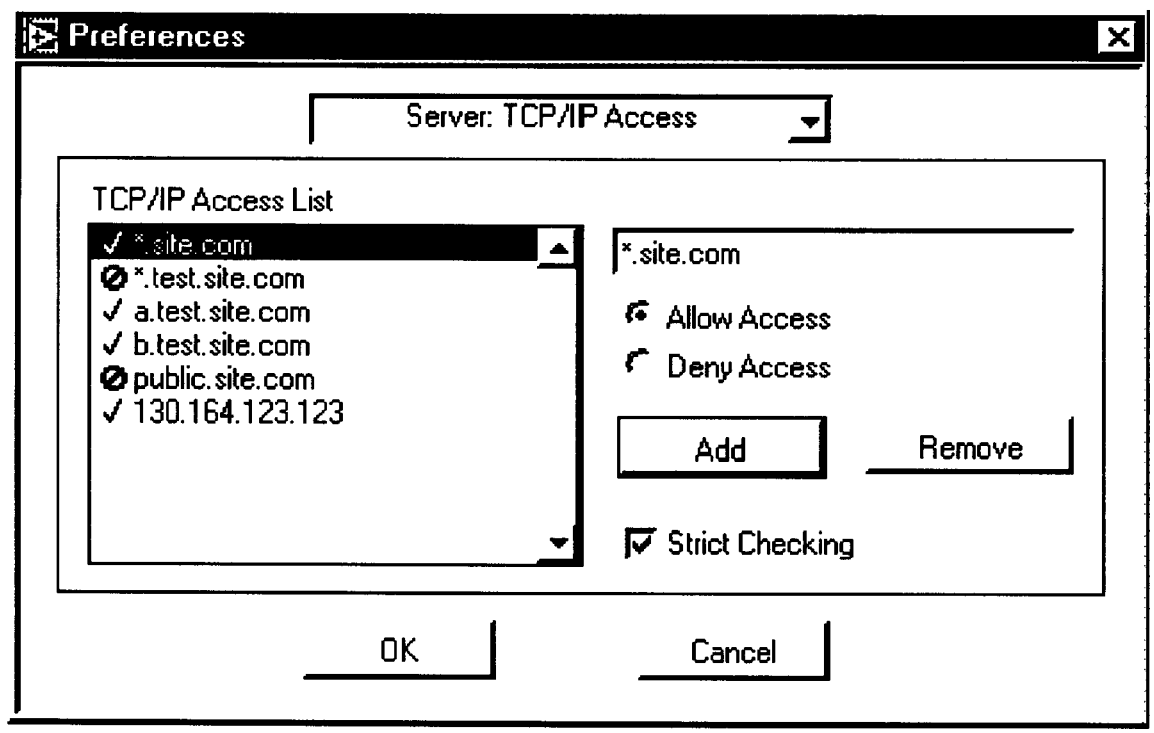
FIG. 17 is a is a screen shot illustrating the TCP/IP Access Dialog Box for selecting TCP/IP access.

When the user allows remote applications to access the VI Server using the TCP/IP protocol, the user should specify which Internet hosts have access to the server. To configure the clients that have access, the user selects Edit>>Preferences on the server machine and selects Server: TCP/IP Access from the drop down menu. The options appear in the Preferences dialog box as shown in FIG. 17.

Selecting Server: TCP/IP Access allows the user to specify which clients can access the VI Server. The TCP/IP Access List describes clients that either have access to or are denied access to the LabVIEW server. To change an entry, the user selects it from the list, then types into the text box at the right of the TCP/IP Access List. The user clicks on the Allow Access radio button to allow the client to access the server. The user clicks the Deny Access radio button to deny the client access to the server. The user clicks the Add button to insert a new entry after the current selection. the user clicks the Remove button to remove the current selection from the list. The user clicks and drags an entry to change its position within the TCP/IP Access List. If an address is allowed access, a check mark appears next to the entry. If an address is denied access, a "cross out" symbol appears next to the entry. If no symbol appears next to the entry, the syntax of the entry is incorrect.

When a client tries to open a connection to the server, the server examines the entries in the TCP/IP Access List to determine whether it grants access to the client. If an entry in the list matches the client's address, the server either allows or denies access, based on how the user set up the entry. If a subsequent entry also matches the client's address, its access permission is used in place of the previous permission. (For example, in FIG. 16 above, a.test.site.com in the TCP/IP Access List is allowed access even though the list indicates that all addresses ending in .test.site.com are not allowed access. See the paragraph on wildcards later in this document.) If no entry matches the client's address, access is denied.

An Internet (IP) address, such as "130.164.123.123", may have one domain name (such as "www.natinst.com") or more associated with it. The conversion from a domain name to its corresponding IP address is called name resolution. The conversion from an IP address to its domain name is called name lookup.

Name lookups and name resolutions are done through system calls that access domain name system (DNS) servers on the Internet. A name lookup or resolution can fail when the system does not have access to a DNS server, or when the address or name is not valid. A resolution problem occurs when an entry contains a domain name that cannot be resolved into an IP address. A lookup problem occurs when an entry contains a partial domain name, such as "*.natinst.com", and the lookup for the client's IP address fails.

The Strict Checking option determines how the server treats access list entries that cannot be compared to a client's IP address because of resolution or lookup problems. When Strict Checking is enabled, a denying access list entry in the TCP/IP Access List that encounters a resolution problem is treated as if it matched the client's IP address. When Strict Checking is disabled, an access list entry that encounters a resolution problem is ignored.

To specify an Internet host address, the user enters its domain name or IP address The * wildcard can be used when specifying Internet host addresses. For example, the user can specify all hosts within the domain domain.com with the entry *.domain.com. The user can specify all hosts in the subnet whose first two octets are 130.164 with the entry 130.164.*. The entry * matches all addresses.

The following table shows some examples of TCP/IP Access List entries.

TABLE 2

| Server: TCP/IP Access | |
|---|---|
| * | Matches all hosts. |
| test.site.com | Matches the host whose domain name is test.site.com. |
| *.site.com | Matches all hosts whose domain name ends with *.site.com. |
| 130.164.123.123 | Matches the host with the IP address 130.164.123.123. |
| 130.164.123.* | Matches all hosts whose IP address starts with 130.164.123. |

In FIG. 17, all hosts in the site.com domain have access to the server, with the exception of all hosts in the test.site.com domain. Additionally, the hosts a.test.site.com, b.test.site.com and 130.164.123.123 have also access to the server. The host public.site.com does not have access, even though it is in the site.com domain.

The default TCP/IP Access settings allow access only to clients on the server machine.

It is noted that, if the VI Server runs on a system that does not have access to a DNS server, domain name entries should not be used in the TCP/IP Access list—requests to resolve the domain name or an IP address will fail, slowing down the system. For performance reasons, place frequently matched entries toward the end of the TCP/IP Access List.

Local Client/Server Communication

When a client on a first computer accesses functionality of a VI located on the first computer, i.e., accesses a local VI, the respective access node, e.g., the call by reference node, the invoke node, or the property node, operates to manipulate or access the VI in a similar manner as if the VI were in the client graphical program.

FIGS. 18A–18D: Client/Server Communication Over a Network

FIGS. 18A–18D illustrate operation of a client on a first computer accessing functionality of a VI located on a second (different) computer. The first computer where the client graphical program executes is referred to as the client, and the second computer where the server graphical program (VI) or application exists is referred to as the server. In this diagram, the squares on the left represent the client side code of LabVIEW, and the circles on the right hand side represent the LabVIEW server code.

Each message that is sent between the client code and the server code contains four fields of information at the very beginning, or message header: 1) an error code, used in reply messages from the server and unused in messages sent from the client. 2) a message identifier that simply identifies the content of the message. 3) a unique identifier that is usually used by the client to identify transactions. The server simply returns this unique id in the reply for that message. For some messages and replies, this field is used as reply information. 4) a message length that contains the number of bytes in any extra data that is contained in the message.

Figure 18A:
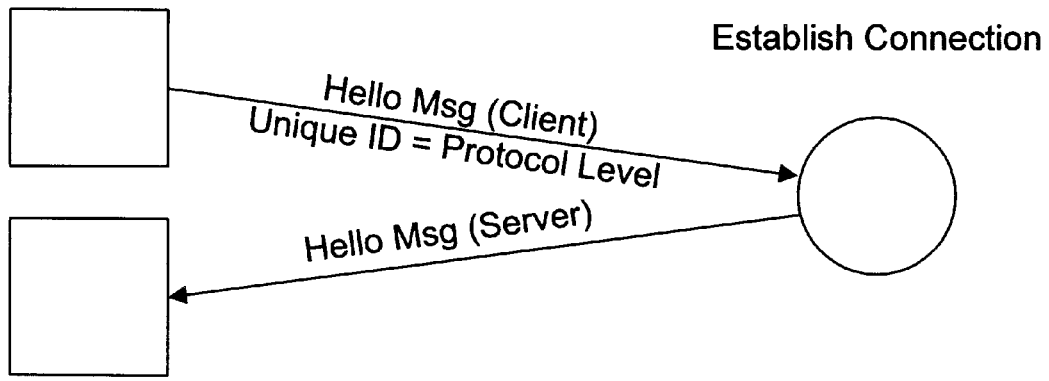
FIGS. 18A–D illustrate how VIs and applications are accessed on remote computer systems according to the present invention.

Referring now to FIG. 18A, in order to establish a connection, the client sends the first message. This first message is basically a "hello" transmitted to the server, and the server replies with a hello message back. The message id indicates that the transmitting device is a client and is saying hello. The unique id informs the server as to what protocol version the client is using. By exchanging the protocol version that each is using, the client code and server code ensure that the other will understand the messages that they send.

The server replies with a hello message saying either that the server is using the same protocol version as the client, or the server returns an error and also tells the client what protocol version the server is communicating with.

Figure 18B:
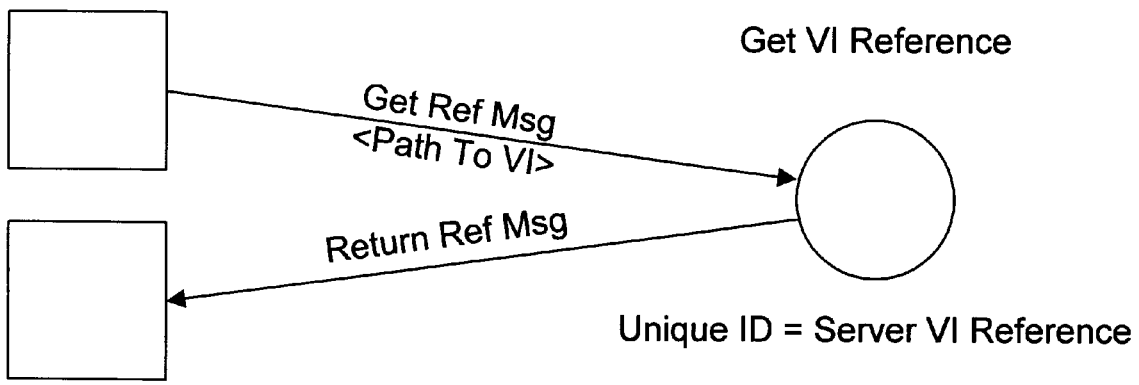

Referring now to FIG. 18B, the Get VI reference operation is shown. The Get VI reference always starts with the client. The client asks the server for a reference to a VI. The most important information that the client transmits to the server is a path to the VI or a VI name that identifies the VI. This information is appended to the end of the message just after the message header. The unique id of the message is generated by the client in such a way that it can match up the reply with the request. The server reply contains this unique id and, appended to the message header, another unique id that is the reference to the server's VI, hereafter referred to as the target VI.

When the client gets a VI reference, the client constructs a "stand-in" VI called a proxy callee. A proxy callee is essentially a stub, i.e., a virtual instrument that contains only the most fundamental of data structures representing a virtual instrument. Any operation that the client desires to perform on the target VI (server VI) goes to the proxy callee, and the operation is sent across the network to the server side and the operation takes place there on the target VI.

Figure 18C:
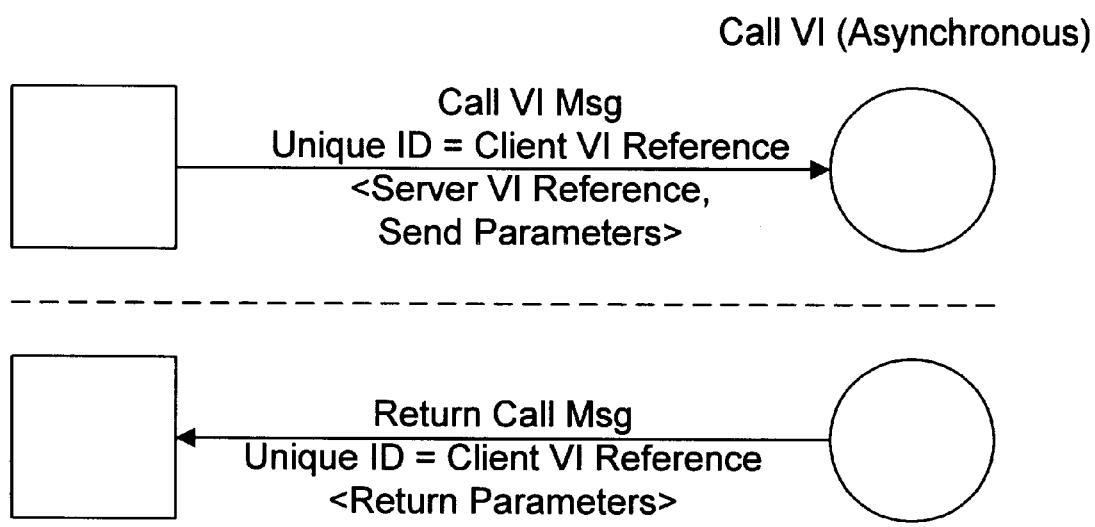

Referring now to FIG. 18C, the Call VI operation is shown. As shown, on the client side, the client actually calls the proxy callee. When the proxy callee in the client is called at run time, the code that actually executes is networking code that basically takes the arguments to the VI, converts them into a well-defined format suitable for transmission over a network connection, and transmits them to the server. The proxy callee sends the flattened data out across the network stream to the server.

On the server side, upon realizing that the client wishes to call the target VI, the server creates another "stand-in" VI, called a proxy caller VI. This proxy caller VI is used to reconstruct the call to the target VI on the server side. It's primary purpose is to simply call the target VI. The server code receives the inputs to the target VI call, converts them into the format that is used for normal execution, and copies them into the proxy caller's data space. The proxy caller is then executed, and it calls the target VI in the same manner as a normal sub VI call.

When the target VI completes and returns, the operation beneath the dotted line is performed. When the target VI finishes, it returns to the proxy caller, which in this example is the target VI proxy caller. The target VI proxy caller on the server side receives the return values, converts them into a well-defined format suitable for transmission over a network connection and sends them back to the client in a message identified as a return call. As shown in FIG. 17C, the return call message includes return parameters which comprise the output of the called or target VI. The return call message also includes the unique id of the client VI reference.

When these parameters are received by the client, the client code finds the VI reference and determines the caller associated with this return call message. The client receives these parameters, converts them into the format that is used for normal execution, and returns the values to the actual caller on the client side.

Figure 18D:
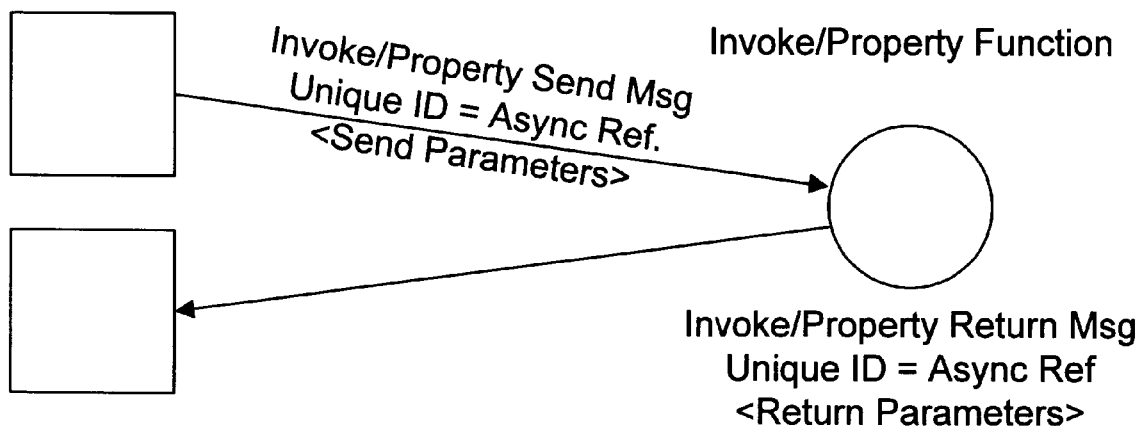

Referring now to FIG. 18D, for the invoke and property functions, operation is similar to that described above with reference to FIG. 18C. For the invoke and property functions, the client is not calling a VI, but rather the client is getting/setting properties on a VI or invoking methods on VIs.

Property Node

Properties—Virtual Instrument Class

The following describes the properties in the VI class which can be get/set by the Property node. These properties are set on a VI in edit mode through VI Setup and the menu options.

TABLE 3

VI Properties Table

| Property Names (Short and Long) | Type Glyph | Description |
|---|---|---|
| AutoLog. Path<br>Auto Logging:Log File Path | | Path to the data log file where front panel data is written along with a timestamp. |
| AutoLog.AtFinish<br>Auto Logging:Log at Finish | [TF] | Specifies whether or not to write front panel values to a datalog file after the VI completes execution. |
| AutoLog.PrintAtFinish<br>AutoLogging:Print at Finish | [TF] | Specifies whether or not to print the front panel after the VI completes execution. |
| Callees<br>Callees' Names | of | List of all the subVIs or callees in a VI. This is a Read-Only Property. |
| Callers<br>Callers' Names | of | List of all the loaded VIs that call the referenced VI. This is a Read-Only Property. |
| ConPane<br>Connector Pane | | Connector pane of the VI defined by the VI refnum. |
| Description<br>VI Description | | VI description. |
| Edit Mode<br>Edit Mode on Open | [TF] | Select if the VI can be edited. Identical to the mode item in the Operate menu. |
| Exec.AllowDebug<br>Execution:Allow Debugging | [TF] | Select if debugging will be allowed on the VI. |
| Exec.CloseFPAfterCall<br>Execution:Close After Call | [TF] | Specifies whether or not to close the front panel after the VI has finished executing. |
| Exec.IsReentrant<br>Execution:Is Reentrant | [TF] | Specifies whether or not a VI can be reentrant. |
| Exec.PrefSys<br>Execution:Preferred Exec System | | Select the preferred execution system for the VI. (See the Multithreading section later in this documentation for more information.) |
| Exec.Priority<br>Execution: Priority | | Select the priority of the VI when it executes in parallel with other tasks. (See the Multithreading section later in this documentation for more information.) |

TABLE 3-continued

VI Properties Table

| Property Names (Short and Long) | Type Glyph | Description |
|---|---|---|
| Exec.RunOnOpen<br>Execution:Run When Opened | [TF] | Specifies whether or not to run the VI when it is opened. |
| Exec.ShowFPOnCall<br>Execution:Show Front Panel on Call | [TF] | Specifies whether or not to show the front panel when the VI is called. |
| Exec.ShowFPOnLoad<br>Execution:Show Front Panel on Load | [TF] | Specifies whether or not to show the front panel when the VI is loaded. |
| Exec.State<br>Execution:State | | Select the execution state of the VI. The four possible values are Bad, Idle, Running top level or Running. Bad means that the VI has errors that make it nonexecutable. Idle means that the VI is not running, but the VI is in memory. Running top level indicates the VI is the top level VI in an active hierarchy. Running means that the VI is reserved for execution by one or more active top-level VIs. This is a Read-Only Property. |
| FP.AllowRTPopup<br>Front Panel Window:Allow Runtime Popup | [TF] | Specifies whether or not to show a popup menu on front panel objects while the VI is executing. |
| FP.AutoCenter<br>Front Panel Window:Auto Center | [TF] | Specifies whether or not to automatically center the front panel when the VI is opened or when it is executing. |
| FP.Closable<br>Front Panel Window:Closable | [TF] | Specifies whether or not the window's close box is disabled and File>>Close is disabled. This property prevents users from closing a VI during execution. |
| FP.HiliteReturnBut<br>Front Panel Window:Highlight Return Button | [TF] | Specifies whether or not to highlight Boolean controls that have a shortcut key of <Enter>. |
| FP.IsDialog<br>Front Panel Window:Is Dialog | [TF] | Specifies whether or not the front panel is a dialog box during execution. If the front panel does act as a dialog box, the user cannot interact with other windows during execution. |
| FP.IsFrontmost<br>Front Panel Window:Is Frontmost | [TF] | Specifies whether or not to bring the front panel to the front. Setting true brings the |

TABLE 3-continued

VI Properties Table

| Property Names (Short and Long) | Type Glyph | Description |
|---|---|---|
| FP.Open<br>Front Panel Window:Open | TF | VI's front panel to the front. Setting false places the VI's front panel at the back of all windows. Getting tells whether the front panel window is the front window (ignoring floaters). This property can be set on non-editable VI. Specifies whether or not to open the front panel window. Setting true opens the window. Setting false closes the window. Getting tells whether the window is currently open. This property can be set on non-editable VI. |
| FP.Origin<br>Front Panel Window:Origin | of 2 | The two elements in the cluster are the vertical and horizontal coordinates of the front panel interior portion that is in the upper-left corner. You can use these coordinates to scroll the front panel. These are in window local coordinates, that is, the numbers refer to the coordinates within an open window. This property can be set on non-editable VI. |
| FP.PanelBounds<br>Front Panel Window:Panel Bounds | of 4 | The four elements in the cluster are the top, left, bottom, and right values of the interior portion of the front panel, not including the scrollbars, title bar, menubar, and toolbar. They are in global screen coordinates, that is, the numbers refer to coordinates within a computer monitor's screen (rather than an open window). This property can be set on non-editable VI. |
| FP.Resizable<br>Front Panel Window:Resizable | TF | Specifies whether or not the user can resize the front panel during execution. |
| FP.ShowMenuBar<br>Front Panel Window:Show Menu Bar | TF | Specifies whether or not to display the menu bar on the front panel during execution. |
| FP.ShowScrollBars<br>Front Panel Window:Show Scroll Bars | TF | Specifies whether or not to show to scroll bars during execution. |
| FP.SizeToScreen<br>Front Panel Window:Size to Screen | TF | Specifies whether or not the front panel is automatically sized to fit the screen. |
| FP.Title<br>Front Panel Window:Title | abc | String that displays in the title bar. It does not have to be the same name as the VI file. |
| FP.TitleBarVis<br>Front Panel Window:Title Bar Visible | TF | Specifies whether or not to display a title bar on the front panel during execution. |
| FP.WinBounds<br>Front Panel Window:Window Bounds | of 4 | The four elements in the cluster are the top, left, bottom, and right values of the front panel window, which includes the interior region, scrollbars, title bar, menubar, and toolbar. They are in global screen coordinates, that is, the numbers refer to coordinates within a computer monitor's screen (rather than an open window). This property can be set on non-editable VI. |
| Help.Path<br>Help:Document Path | | Path of a help file which is linked to the VI. |
| Help.Tag<br>Help:Document Tag | abc | Keyword of the topic name in the help file that you want to link to the VI. |
| Hist.AddAtSave<br>History:Always Add Comments at Save | TF | Specifies whether or not to add a comment to the VI history every time the VI is saved. |
| Hist.Text<br>Histroy:Entire Text | abc | Text that has been added to the VI history. This is a Read-Only Property. |
| Hist.PromptAtClose<br>History:Prompt for Comments at Close | TF | Specifies whether or not to prompt for a VI history comment when the VI is closed. |
| Hist.PromptAtSave<br>History:Prompt for Comments at Save | TF | Specifies whether or not to prompt for a VI history comment when the VI is saved. |
| Hist.RecLVComments<br>History:Record Application Comments | TF | Specifies whether or not to add comments to the VI history when certain events occur, like conversion to a new version of LabVIEW, subVI changes, and changes to the name or path of the VI. |
| Hist.UseDflt | TF | Specifies whether or |

TABLE 3-continued

VI Properties Table

| Property Names (Short and Long) | Type Glyph | Description |
|---|---|---|
| History:Use Defaults | | not to use the default history comment, which is the name of the VI and the date and time the VI is saved, or to use the values entered in other history properties. |
| Metric.CodeSize<br>Metrics:Code Size | UH | The amount of memory used for VI code in bytes. This is a Read-Only Property. |
| Metric.BDSize<br>Metrics:Size of Block Diagram | UH | The size of the block diagram in bytes. This is a Read-Only Property. |
| Metric.FPSize<br>Metrics:Front Panel Size | UH | The size of the front panel in bytes. This is a Read-Only Property. |
| Metric.DataSize<br>Metrics:Total Data Size | UH | The amount of memory allocated for data in bytes. This is a Read-Only Property. |
| Mods.BD<br>Modifications:Block Diagram Mods Bitset | UH | Modifications made to the block diagram since the VI has been saved or opened, depending on which was last. The important aspect you need to know about this value is if it is zero or not. Non-zero means that there have been changes. This is a Read-Only Property. |
| Mods.FP<br>Modifications:VI Front Panel Mods Bitset | UH | Modifications made to the front panel since the VI has been saved, depending on which was last. The important aspect you need to know about this value is if it is zero or not. Non-zero means that there have been changes. This is a Read-Only Property. |
| Mods.VI<br>Modifications:VI Modification Bitset | UH | Modifications made to the VI settings since the VI has been saved, depending on which was last. The important aspect you need to know about this value is if it is zero or not. Non-zero means that there have been changes. This is a Read-Only Property. |
| Name | abc | Name of the VI file |
| VI Name | | name, which can be set only if VI has not been saved to disk. |
| Password<br>Password | abc | Password to protect the block diagram, which can be set only if you provide the correct password at Open VI Reference. This is a Write-Only Property. |
| Path<br>VI Path | path | Path of the VI file. This is a Read-Only Property. |
| TB.ShowAbortBut<br>Tool Bar:Show Abort Button | TF | Specifies whether or not to display the abort button in the toolbar. |
| TB.ShowFreeRunBut<br>Tool Bar:Show Free Run Button | TF | Specifies whether or not to display the continuous run button in the toolbar. |
| TB.ShowRunBut<br>Tool Bar:Show Run Button | TF | Specifies whether or not to display the run button in the toolbar. |
| TB.Visible<br>Tool Bar:Visible | TF | Specifies whether or not to display the toolbar while the VI is executing. |

Properties—Application Class

The following table describes the properties which can be The names listed in the following table are the short names for all the properties. The print properties are used to configure what is to be printed. To actually print VI information, the Invoke Node is used using one of the print methods.

TABLE 4

Application Properties Table

| Property Names (Short and Long) | Type Glyph | Description |
|---|---|---|
| App.AllVIS<br>Application:All VIs in Memory | of<br>abc | Return list of VIs in memory. Property will return an error if used to return a list of remote VIs. This property is available only in the local versions of LabVIEW. This is a Read-Only Property. |
| App.DirPath<br>Application:Directory Path | abc | Directory in which LabVIEW resides. This is a Read-Only Property. |
| App.ExportedVIs<br>Application: Exported VIs in Memory | of<br>abc | Return list of VIs in memory. This is a Read-Only Property. |
| App.Kind<br>Application:Kind | | Full Development, Application Library, or Student Edition |

TABLE 4-continued

Application Properties Table

| Property Names (Short and Long) | Type Glyph | Description |
|---|---|---|
| App.Name<br>Application:Name | abc | This is a Read-Only Property. Filename of an application executable file. |
| App.TargetCPU<br>Application:Target CPU | (I) | This is a Read-Only Property. 68K, PowerPC, X86, Sparc, and PA-RISC |
| App.TargetOS<br>Application:Target Operating System | (I) | This is a Read-Only Property. The operating system for which the application was built: MacOS, Win 3.1, Win 95/NT, Solaris 1, Solaris 2, Power UNIX, HP/UX. |
| App.UserName<br>Application:User Name | abc | This is a Read-Only Property. User name used to open the application. |
| App.Version<br>Application:Version Number | abc | Version number of the application. |
| OS.Name<br>Operating System:Name | abc | This is a Read-Only Property. Name of the operating system where the application is actually running. The only instance where the App.TargetOS is different from the OS.Name is when you can run Win 3.1 applications on Win NT. |
| OS.Version<br>Operating System:Version Number | abc | This is a Read-Only Property. Version number of the actual operating system. |
| Pr.CustConn?<br>Printing:Custom Connector? | TF | This is a Read-Only Property. Specifies whether or not to print the connector and icon of VIs when using the custom format with one of the print documentation VI methods. |
| Pr.CustCtlDesc?<br>Printing:Custom Control Descriptions? | TF | Specifies whether or not to print descriptions of front panel controls when using the custom format with one of the print documentation VI methods. |
| Pr.CustCtlType?<br>Printing:Custom Control Types? | TF | Specifies whether or not to print data type information for front panel controls when using the custom format with one of the print documentation VI methods. |
| Pr.CustCtl?<br>Printing:Custom Controls? | TF | Specifies whether or not to print front panel control information when using the custom format with one of the print documentation VI methods. |
| Pr.CustDesc?<br>Printing:Custom Description? | TF | Specifies whether or not to print VI descriptions when using the custom format with one of the print documentation VI methods. |
| Pr.CustDiagHidden?<br>Printing:Custom Diagram Hidden? | TF | Specifies whether or not to print the hidden frames in Case and Sequence Structures that might be present in the block diagram when using the custom format with one of the print documentation VI methods. |
| Pr.CustDiagRepeat?<br>Printing:Custom Diagram Repeat? | TF | Specifies whether or not to print visible frames in sequence with the not-visible frames when using the custom format with one of the print documentation VI methods. If you decide to print the visible frames in sequence, those frames will be printed twice. |
| Pr.CustDiag?<br>Printing:Custom Diagram | TF | Specifies whether or not to print block diagrams when using the custom format with one of the print documentation VI methods. |
| Pr.CustHier?<br>Printing:Cutom Hierarchy | TF | Specifies whether or not to print the hierarchy of the VI in memory when using the custom format with one of the print documentation VI methods. |
| Pr.CustHist?<br>Printing:Custom History? | TF | Specifies whether or not to print the VI history information when using the custom format with one of the print documentation VI methods. |
| Pr.CustPanelBrdr?<br>Printing:Custom Panel Border? | TF | Specifies whether or not to print the front panel with a border when using the custom format with one of the print documentation VI methods. |
| Pr.CustPanel?<br>Printing:Custom Panel? | TF | Specifies whether or not to print the front panel when using the custom format with one of the print documentation VI |

TABLE 4-continued

Application Properties Table

| Property Names (Short and Long) | Type Glyph | Description |
|---|---|---|
| Pr.CustSubVIs?<br>Printing:Custom SubVIs? | [TF] | methods.<br>Specifies whether or not to print a list of the subVIs including the icon, name, and path when using the custom format with one of the print documentation VI methods. |
| Pr.FileWrapText<br>Printing:File Wrap Text Length | [UH] | Maximum number of characters on a single line in a text file. Affects the Print Docs to HTML, RTF, and text file methods. If 0 is the value then the text does not wrap and all the characters are printed on one line. |
| Pr.JPEGQuality<br>Printing:JPEG Quality | [UH] | Percentage value from 0 to 100 specifying the quality of a JPEG graphic in VIs printed either interactively or with the Print Docs to HTML method. Since JPEG is lossy technology, the higher the percentage the better the quality. 80% is the default value. |
| Pr.PNGCmpLvl<br>Printing:PNG Compression Level | [UH] | Number between 0 and 9 that specifies the level of compression on PNG-format graphics in VIs printed either interactively or with the Print Docs to HTML method. The quality of the graphic is not affected by the compression, but the graphic file size and speed of compression are affected by this value.<br>9 designates no compression and 0 designates high compression. 5 is the default value. |
| Srvr.TCPAccessList<br>Server:TCP/IP Access List | [□] of [abc] | List that describes which TCP/IP addresses of remote clients may access the VI server. (See Configuring the VI Server later in this document for more information.)<br>Each element in the array should start with '+' to allow access, or with '−' to deny access.<br>For example, the array with the elements ["+*.site.com", "−private.site.com"] |
| Srvr.VIAccessList<br>Server:VIAccess List | [□] of [abc] | allows access for all hosts in the site.com domain, with the exception of private.site.com. This property is available only on local versions of LabVIEW.<br>List that describes which VIs on the VI server are accessible by remote clients. (See Configuring the VI Server later in this document for more information.)<br>Each element in the array should start with '+' to allow access, or with '−' to deny access.<br>For example, the array with the element ["+Server*"] allows access to all VIs whose name starts with "Server".<br>This property is available only on local versions of LabVIEW. |

Invoke Node

Methods—Virtual Instrument Class

This section describes the various methods the user can invoke from the Invoke Node for the Virtual Instrument Class. Required parameters appear in bold in the Parameter tables below.

1. Abort Instrument—Stops the VI execution
2. Export VI Strings

Exports the following strings about VI and front panel objects to a tagged text file: VI name and description, object caption labels, panel free labels, default data (string, table, path, and array default data), and private data (list box item names, table row and column headers, graph plot names, and graph cursor names). This performs similarly to the project menu item.

| Parameters | | |
|---|---|---|
| String File | [▰] | Path of the VI strings file, including the file name. If you do not enter a file name, make sure to set interactive to true so the user can set the VI strings file name. |
| Interactive | [TF] | Specifies whether or not or not you want the user to see the file dialog box to select the name of the VI strings file.<br>Default value is False. |
| Log File | [▰] | Path of the log file created to list errors that occurred while exporting VI strings to a tagged text file.<br>Default value is no logging. |

3. Import VI Strings

Imports the following strings about VI and front panel objects from a tagged text file: VI name and description, object caption labels, object free labels, default data (string, table, and array default data), and private data (list box item names, table row and column headers, graph plot names, and graph cursor names). This performs similarly to the project menu item.

| Parameters | | |
|---|---|---|
| String File | | Path of the VI strings file, including the file name. If you do not enter a file name, make sure to set interactive to true so the user can set the VI strings file name. |
| Interactive | [TF] | Specifies whether or not you want the user to see the file dialog box to select the name of the VI strings file. Default value is False. |
| Log File | | Path of the log file created to list errors that occurred while importing VI strings from a tagged text file. Default value is no logging. |

4. Print VI to HTML

Prints the VI information to an HTML file and the graphics are saved in external files.

| Parameters | | |
|---|---|---|
| HTML File Path | | Designate the path of the HTML file. |
| Append? | [TF] | Specifies whether or not the new information will be appended to an existing HTML file. |
| Format | | Select the printout format: Custom, Standard, Using Panel, Using SubVI, Complete. When you use the Custom format, use the Property Node with the application class properties to set up your print options. The Standard format prints the VI icon, description, front panel, and block diagram. The Using Panel format prints the front panel, VI description, and control names and their descriptions. The Using SubVI format prints the icon, connector, VI description, and connected control terminals, names, and descriptions. The Complete forma prints all the information listed above. |
| Image Format | | Select the format of the graphic files, PNG or JPEG. |
| Image Depth | | Select the color depth (number of supported colors) for the graphics. The choices are 2 colors (black and white), 16 colors, 256 colors, and 2^24 colors (true color). |
| Image Directory | | Select the directory where the graphic files will be saved. |

5. Print VI to Printer

Prints the VI information to a printer.

| Parameters | | |
|---|---|---|
| Format | | See the Format parameter description in the Print VI to HTML description above. |
| Scale Panel? | [TF] | Specifies whether or not the front panel will be scaled to fit the page. |
| Scale Diagram? | [TF] | Specifies whether or not the block diagram will be scaled to fit the page. |
| Page Headers? | [TF] | Specifies whether or not page headers (which include the page number, VI name, and last modification data) will be printed. |
| Page Breaks? | [TF] | Specifies whether or not page breaks will be inserted between the following sections: connector icon and description, front panel, list of front panel control details, block diagram, block diagram details, VI hierarchy, and list of subVIs. |
| Section Headers? | [TF] | Specifies whether or not to print headers for each section listed above. |

6. Print VI to RTF

Prints the VI information to an RTF file.

| Parameters | | |
|---|---|---|
| RTF File Path | | Designate the path of the RTF file. |
| Append? | [TF] | Specifies whether or not the new information will be appended to an existing RTF file. |
| Format | | See the Format parameter description in the Print VI to HTML description above. |
| Image Format | | Select the format of the graphic files, BMP. |
| Image Depth | | Select the color depth (number of supported colors) for the graphics. The choices are 2 colors (black and white), 16 colors, 256 colors, and 2^24 colors (true color). |
| Image Directory | | Select the directory where the graphic files will be saved. |
| Help Format? | [TF] | Specifies whether or not to save the graphics externally and place references in the RTF file. This method is suggested if you are creating a online help file. |

7. Print VI to Text

Prints the VI information to a text file.

| Parameters | | |
|---|---|---|
| Text File Path | | Designate the path of the text file. |
| Append? | [TF] | Specifies whether or not the new information will be appended to an existing text file. |
| Format | | See the Format parameter description in the Print VI to HTML description above. |

8. Run Instrument

Starts the VI execution.

| Parameters | | |
|---|---|---|
| Wait Until Done? | [TF] | Specifies whether or not to wait until the VI completes execution before exiting this function. Default is true. |

9. Save Instrument
Saves a VI.

| Parameters | | |
|---|---|---|
| Path to saved file | | Designate the path of the VI file. Default is to the current location. |
| Save a Copy | [TF] | Save a copy of the VI to another file. Default value is False. |
| Without Diagram | [TF] | Save the VI without the block diagram. Default value is False. |

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for creating a client graphical program which accesses capabilities of a server graphical program, wherein the method operates in a computer including a display screen and a user input device, the method comprising:
   displaying on the screen an open reference node in response to user input;
   specifying access information to the server graphical program, wherein said access information is provided to said open reference node;
   wherein said open reference node is operable to provide a reference to the server graphical program;
   displaying on the screen a call node in response to user input, wherein said call node is operable to call the server graphical program;
   connecting said open reference node to said call node in response to user input, wherein said open reference node is operable to provide said reference to the server graphical program to said call node;
   wherein said call node receives said reference to the server graphical program, wherein said call node is operable to call the server graphical program during execution of the client graphical program.

2. The method of claim 1, further comprising:
   constructing execution instructions in response to the client graphical program, wherein said execution instructions are executable to call the server graphical program during execution of the client graphical program.

3. The method of claim 2, further comprising:
   executing said execution instructions, wherein said call node invokes execution of the server graphical program during said executing.

4. The method of claim 1, wherein said specifying access information to the server graphical program comprises:
   displaying on the screen an icon which represents said access information; and
   connecting said icon to said open reference node, wherein said connecting is operable to provide said access information to said open reference node.

5. The method of claim 1, wherein said specifying access information to the server graphical program comprises specifying a name of the server graphical program.

6. The method of claim 1, wherein said specifying access information to the server graphical program comprises specifying a path of the server graphical program.

7. The method of claim 6, wherein the client graphical program resides on a first computer, wherein the server graphical program resides on a second computer connected to the client computer.

8. The method of claim 1, further comprising:
   specifying type information of the server graphical program; and
   the call node receiving said type information of the server graphical program, wherein said call node is operable to use said type information to call the server graphical program during execution of said graphical program.

9. The method of claim 8, wherein said type information specifies input terminals and output terminals of the server graphical program; the method further comprising:
   the call node adapting to include input and output terminals corresponding to said type information in response to receiving said type information.

10. The method of claim 9, wherein said type information specifies a connector pane of the server graphical program;
    wherein the call node adapts to include the connector pane of the server graphical program in response to receiving said type information.

11. The method of claim 10, wherein the call node is comprised in the client graphical program;
    wherein the method for creating a client graphical program further comprises:
    displaying on the screen a plurality of nodes;
    connecting at least one first node to at least one of said input terminals;
    connecting at least one of said output terminals to at least one second node;
    wherein during execution of the client graphical program said call node is operable to call the server graphical program and provide an output of said at least one first node to the server graphical program, wherein said call node is operable to provide an output of the server graphical program to said at least one second node.

12. The method of claim 11, further comprising:
    executing the client graphical program, wherein said executing the client graphical program includes:
    said at least one first node generating a first output;
    said at least one of said input terminals receiving said first output;
    the call node calling the server graphical program, wherein said calling includes providing said first output of said at least one first node;
    the server graphical program executing using said first output of said at least one first node, wherein the server graphical program generates a second output;
    the call node receiving said second output;
    the call node providing said second output to said at least one second node.

13. The method of claim 8, wherein said type information is provided to said open reference node;
    the method further comprising:
    connecting said open reference node to said call to provide said type information to the server graphical program.

14. The method of claim 11, further comprising:
    executing the client graphical program, wherein said executing the client graphical program includes:
    the open reference node locating the server graphical program using said access information;
    the open reference node determining that said specified type information of the server graphical program matches type information obtained from the server graphical program.

15. The method of claim 1, further comprising:

displaying on the screen a close reference node in response to user input;

connecting said call node to said close reference node in response to user input, wherein said close reference node is operable to close a connection to the server graphical program.

16. The method of claim 1, wherein said connecting said open reference node to said call node comprises displaying on the screen a wire connecting said open reference node to said call node.

17. The method of claim 1, further comprising:

displaying on the screen a server control in response to user input;

specifying a class of the server graphical program, wherein said class is provided to said open reference node.

18. A system for creating a client graphical program which is operable to call a server graphical program, comprising:

a computer including a CPU and memory, wherein the computer system further includes a display screen and a user input device for receiving user input;

an open reference node which is displayed on the screen in response to user input, wherein said open reference node is operable to provide a reference to the server graphical program;

a call node displayed on the screen in response to user input, wherein said call node is operable to call the server graphical program;

a wire which is displayed on the screen in response to user input for connecting said open reference node to said call node, wherein said open reference node is operable to provide information on the server graphical program to said call node;

wherein said call node receives said information on said object, wherein said call node is operable to call the server graphical program during execution of the client graphical program.

19. The system of claim 18, further comprising an instrument operably coupled to said computer, wherein the client graphical program is operable to call the server graphical program for controlling said instrument.

20. The system of claim 18, further comprising:

a program stored in the memory of the computer system for constructing execution instructions in response to the client graphical program, wherein said execution instructions are executable to call the server graphical program during execution of the client graphical program.

21. A computer-implemented method for creating a client graphical program which accesses capabilities of a server graphical program, wherein the method operates in a computer including a display screen and a user input device, the method comprising:

displaying on the screen an open reference node in response to user input;

specifying access information to the server graphical program, wherein said access information is provided to said open reference node;

wherein said open reference node is operable to provide a reference to the server graphical program;

displaying on the screen a property node in response to user input, wherein said property node is operable to get/set properties in the server graphical program;

connecting said open reference node to said property node in response to user input, wherein said open reference node is operable to provide said reference to the server graphical program to said property node;

wherein said property node receives said reference to the server graphical program, wherein said property node is operable to get/set properties in the server graphical program during execution of the client graphical program.

22. The method of claim 21, further comprising:

constructing execution instructions in response to the client graphical program, wherein said execution instructions are executable to get/set properties in the server graphical program during execution of the client graphical program.

23. The method of claim 22, further comprising:

executing said execution instructions, wherein said property node gets and/or sets properties in the server graphical program during said executing.

24. The method of claim 21, wherein said specifying access information to the server graphical program comprises:

displaying on the screen an icon which represents said access information; and connecting said icon to said open reference node, wherein said connecting is operable to provide said access information to said open reference node.

25. The method of claim 21, wherein said specifying access information to the server graphical program comprises specifying a name of the server graphical program.

26. The method of claim 21, wherein said specifying access information to the server graphical program comprises specifying a path of the server graphical program.

27. The method of claim 26, wherein the client graphical program resides on a client computer, wherein the server graphical program resides on a second computer connected to the client computer.

28. A system for creating a client graphical program which is operable to get/set properties in the server graphical program, comprising:

a computer including a CPU and memory, wherein the computer system further includes a display screen and a user input device for receiving user input;

an open reference node which is displayed on the screen in response to user input, wherein said open reference node is operable to provide a reference to the server graphical program;

a property node displayed on the screen in response to user input, wherein said property node is operable to get/set properties in the server graphical program;

a wire which is displayed on the screen in response to user input for connecting said open reference node to said property node, wherein said open reference node is operable to provide information on the server graphical program to said property node;

wherein said call node receives said information on said object, wherein said call node is operable to get/set properties in the server graphical program during execution of the client graphical program.

29. The system of claim 28, further comprising an instrument operably coupled to said computer, wherein the client graphical program is operable to get/set properties in the server graphical program for controlling said instrument.

30. The system of claim 28, further comprising:

a program stored in the memory of the computer system for constructing execution instructions in response to the client graphical program, wherein said execution instructions are executable to get/set properties in the server graphical program during execution of the client graphical program.

31. A computer-implemented method for creating a client graphical program which accesses capabilities of a server graphical program, wherein the method operates in a computer including a display screen and a user input device, the method comprising:

displaying on the screen an open reference node in response to user input;

specifying access information to the server graphical program, wherein said access information is provided to said open reference node;

wherein said open reference node is operable to provide a reference to the server graphical program;

displaying on the screen an invoke node in response to user input, wherein said invoke node is operable to invoke methods in the server graphical program;

connecting said open reference node to said invoke node in response to user input, wherein said open reference node is operable to provide said reference to the server graphical program to said invoke node;

wherein said invoke node receives said reference to the server graphical program, wherein said invoke node is operable to invoke methods in the server graphical program during execution of the client graphical program.

32. The method of claim 31, further comprising:

constructing execution instructions in response to the client graphical program, wherein said execution instructions are executable to invoke methods in the server graphical program during execution of the client graphical program.

33. The method of claim 32, further comprising:

executing said execution instructions, wherein said invoke node invokes methods in the server graphical program during said executing.

34. The method of claim 31, wherein said specifying access information to the server graphical program comprises:

displaying on the screen an icon which represents said access information; and connecting said icon to said open reference node, wherein said connecting is operable to provide said access information to said open reference node.

35. The method of claim 31, wherein said specifying access information to the server graphical program comprises specifying a name of the server graphical program.

36. The method of claim 31, wherein said specifying access information to the server graphical program comprises specifying a path of the server graphical program.

37. The method of claim 36, wherein the client graphical program resides on a first computer, wherein the server graphical program resides on a second computer connected to the first computer.

38. A system for creating a client graphical program which is operable to invoke methods in the server graphical program, comprising:

a computer including a CPU and memory, wherein the computer system further includes a display screen and a user input device for receiving user input;

an open reference node which is displayed on the screen in response to user input, wherein said open reference node is operable to provide a reference to the server graphical program;

an invoke node displayed on the screen in response to user input, wherein said invoke node is operable to invoke methods in the server graphical program;

a wire which is displayed on the screen in response to user input for connecting said open reference node to said invoke node, wherein said open reference node is operable to provide information on the server graphical program to said invoke node;

wherein said call node receives said information on said object, wherein said invoke node is operable to invoke methods in the server graphical program during execution of the client graphical program.

39. The system of claim 38, further comprising an instrument operably coupled to said computer, wherein the client graphical program is operable to invoke methods in the server graphical program for controlling said instrument.

40. The system of claim 38, further comprising:

a program stored in the memory of the computer system for constructing execution instructions in response to the client graphical program, wherein said execution instructions are executable to invoke methods in the server graphical program during execution of the client graphical program.

41. A computer-implemented method for creating a client graphical program which accesses capabilities of a server graphical program, wherein the method operates in a computer including a display screen and a user input device, the method comprising:

displaying on the screen an open reference node in response to user input;

specifying access information to the server graphical program, wherein said access information is provided to said open reference node;

wherein said open reference node is operable to provide a reference to the server graphical program;

displaying on the screen an access node in response to user input, wherein said access node is operable to access capabilities in the server graphical program;

connecting said open reference node to said access node in response to user input, wherein said open reference node is operable to provide said reference to the server graphical program to said access node;

wherein said access node receives said reference to the server graphical program, wherein said access node is operable to access capabilities in the server graphical program during execution of the client graphical program.

42. The method of claim 41, wherein said access node comprises a property node;

wherein said property node is operable to get/set properties of the server graphical program during execution of the client graphical program.

43. The method of claim 41, wherein said access node comprises an invoke node;

wherein said invoke node is operable to invoke methods of the server graphical program during execution of the client graphical program.

44. A computer-implemented method for creating a client graphical program which accesses capabilities of a graphical programming application, wherein the method operates in a computer including a display screen and a user input device, the method comprising:

displaying on the screen an open reference node in response to user input;

specifying access information to the graphical programming application, wherein said access information is provided to said open reference node;

wherein said open reference node is operable to provide a reference to the graphical programming application;

displaying on the screen an access node in response to user input, wherein said access node is operable to access the graphical programming application;

connecting said open reference node to said access node in response to user input, wherein said open reference node is operable to provide said reference to the graphical programming application to said access node;

wherein said access node receives said reference to the graphical programming application, wherein said access node is operable to access the graphical programming application during execution of the client graphical program.

45. The method of claim 44, wherein said access node comprises a property node;

wherein said property node is operable to get/set properties of the graphical programming application during execution of the client graphical program.

46. The method of claim 44, wherein said access node comprises an invoke node;

wherein said invoke node is operable to invoke methods of the graphical programming application during execution of the client graphical program.

47. A computer-implemented method for creating a graphical program which accesses capabilities of a server program, wherein the method operates in a computer including a display screen and a user input device, the method comprising:

displaying on the screen a call node in the graphical program in response to user input, wherein said call node is operable to call the server program;

configuring the call node to receive a reference to the server program wherein said call node is operable to call the server program during execution of the client graphical program.

48. The method of claim 47, wherein said call node includes a server program reference input for receiving a reference to the server program;

wherein said configuring comprises connecting said server program reference input of said call node to receive the reference to the server program;

wherein said call node receives the reference to the server program on the server program reference input during execution of the graphical program.

49. The method of claim 48, wherein said configuring comprises:

displaying on the screen a server program reference node in response to user input, wherein said server program reference node includes a server program reference output that provides the reference to the server program; and connecting the server program reference output of said server program reference node to said server program reference input of said call node in response to user input.

50. The method of claim 49, wherein said configuring further comprises:

specifying access information to the server program, wherein said access information is provided to said server program reference node;

wherein said server program reference node is operable to provide a reference to the server program.

51. The method of claim 50, wherein said specifying access information to the server program comprises:

displaying on the screen an icon which represents said access information; and connecting said icon to said server program reference node, wherein said connecting is operable to provide said access information to said server program reference node.

52. The method of claim 50, wherein said specifying access information to the server program comprises specifying one or more of a name of the server program or a path of the server program.

53. The method of claim 47, wherein said configuring comprises:

connecting a server program reference node to said call node in response to user input, wherein said server program reference node is operable to provide the reference to the server program to said call node;

wherein said call node receives the reference to the server program.

54. The method of claim 47, further comprising:

constructing execution instructions in response to the graphical program, wherein said execution instructions are executable to call the server program during execution of the graphical program; and executing said execution instructions, wherein said call node invokes execution of the server program during said executing.

55. The method of claim 47, wherein the server program is a graphical program.

56. The method of claim 47, wherein the graphical program resides on a first computer, wherein the server program resides on a second computer connected to the first computer.

57. The method of claim 47, further comprising:

specifying type information of the server program; and the call node receiving said type information of the server program, wherein said call node is operable to use said type information to call the server program during execution of said graphical program.

58. The method of claim 57, wherein said type information specifies input terminals and output terminals of the server program; the method further comprising:

the call node adapting to include input and output terminals corresponding to said type information in response to receiving said type information.

59. The method of claim 58, wherein said type information specifies a connector pane of the server program;

wherein the call node adapts to include the connector pane of the server program in response to receiving said type information.

60. The method of claim 59, wherein the method for creating the graphical program further comprises:

displaying on the screen at least one first node;

connecting the at least one first node to at least one of said input terminals of said call node;

displaying on the screen at least one second node;

connecting at least one of said output terminals of said call node to the at least one second node;

wherein during execution of the graphical program said call node is operable to call the server program and provide an output of the at least one first node to the server program, wherein the server program is operable to receive said output of the at least one first node and execute to generate a server program output in response thereto;

wherein said call node is operable to provide the server program output of the server program to the at least one second node.

61. The method of claim 60, further comprising:

executing the graphical program, wherein said executing the graphical program includes:
- said at least one first node generating a first output;
- said at least one of said input terminals of said call node receiving said first output;
- the call node calling the server program, wherein said calling includes providing said first output of said at least one first node;
- the server program executing using said first output of said at least one first node, wherein the server program generates a second output;
- the call node receiving said second output;
- the call node providing said second output to said at least one second node.

62. A system for creating a graphical program which is operable to call a server program, comprising:
- a computer including a CPU and memory, wherein the computer system further includes a display screen and a user input device for receiving user input;
- a graphical program which is displayed on the screen in response to user input, wherein said graphical program includes a call node displayed on the screen, wherein said call node is operable to call the server program, wherein said call node is configurable to receive a reference to the server program
- wherein said call node is operable to call the server program during execution of the graphical program.

63. The system of claim 62, wherein said call node includes a server program reference input for receiving a reference to the server program;
- wherein said server program reference input of said call node is connected to receive the reference to the server program;
- wherein said call node receives the reference to the server program on the server program reference input during execution of the graphical program.

64. The method of claim 63, wherein said configuring comprises:
- wherein said graphical program includes a server program reference node, wherein said server program reference node includes a server program reference output that provides the reference to the server program; and
- wherein the server program reference output of said server program reference node is connected to said server program reference input of said call node.

65. The system of claim 62, further comprising an instrument operably coupled to said computer, wherein the graphical program is operable to call the server program for controlling said instrument.

66. The system of claim 62, further comprising:
- a program stored in the memory of the computer system for constructing execution instructions in response to the graphical program, wherein said execution instructions are executable to call the server program during execution of the graphical program.

* * * * *

UNITED STATES PATENT AND TRADEMARK OFFICE
CERTIFICATE OF CORRECTION

PATENT NO. : 6,102,965
DATED : August 15, 2000
INVENTOR(S) : Dye et al.

It is certified that error appears in the above-identified patent and that said Letters Patent is hereby corrected as shown below:

Claim 64, column 48,
Line 10, please delete "The method of claim 63, wherein said configuring comprises:" and substitute -- The system of claim 63: --.

Signed and Sealed this

Second Day of October, 2001

Attest:

NICHOLAS P. GODICI
Attesting Officer
Acting Director of the United States Patent and Trademark Office